US009336456B2

(12) United States Patent
DeLean

(10) Patent No.: US 9,336,456 B2
(45) Date of Patent: May 10, 2016

(54) SYSTEMS, METHODS AND COMPUTER PROGRAM PRODUCTS FOR IDENTIFYING OBJECTS IN VIDEO DATA

(75) Inventor: Bruno DeLean, Andorra la Vella (AD)

(73) Assignee: Bruno Delean, Andorra (AD)

( * ) Notice: Subject to any disclaimer, the term of this patent is extended or adjusted under 35 U.S.C. 154(b) by 198 days.

(21) Appl. No.: 13/590,384

(22) Filed: Aug. 21, 2012

(65) Prior Publication Data

US 2013/0216094 A1    Aug. 22, 2013

Related U.S. Application Data

(60) Provisional application No. 61/590,414, filed on Jan. 25, 2012.

(51) Int. Cl.
*G06K 9/00* (2006.01)
*G06K 9/62* (2006.01)

(52) U.S. Cl.
CPC .......... *G06K 9/6201* (2013.01); *G06K 9/00335* (2013.01); *G06K 9/6262* (2013.01)

(58) Field of Classification Search
None
See application file for complete search history.

(56) References Cited

U.S. PATENT DOCUMENTS

| | | | |
|---|---|---|---|
| 5,454,043 A | 9/1995 | Freeman | |
| 5,581,276 A | 12/1996 | Cipolla | |
| 5,594,469 A | 1/1997 | Freeman et al. | |
| 5,714,698 A | 2/1998 | Tokioka et al. | |
| 6,002,808 A | 12/1999 | Freeman | |
| 6,016,148 A | 1/2000 | Kang et al. | |
| 6,072,494 A | 6/2000 | Nguyen | |
| 6,111,580 A | 8/2000 | Kazama et al. | |
| 6,115,482 A | 9/2000 | Sears et al. | |
| 6,256,033 B1 | 7/2001 | Nguyen | |
| 6,259,802 B1 | 7/2001 | Jolly et al. | |
| 6,351,222 B1 | 2/2002 | Swan et al. | |
| 6,400,996 B1 | 6/2002 | Hoffberg et al. | |
| 6,498,628 B2 | 12/2002 | Iwamura | |
| 6,501,515 B1 | 12/2002 | Iwamura | |
| 6,600,475 B2 | 7/2003 | Gutta et al. | |
| 6,611,206 B2 | 8/2003 | Eshelman | |
| 6,624,833 B1 | 9/2003 | Kumar | |
| 6,640,145 B2 | 10/2003 | Hoffberg | |
| 6,674,895 B2 | 1/2004 | Rafii et al. | |
| 6,681,031 B2 | 1/2004 | Cohen et al. | |
| 6,703,999 B1 | 3/2004 | Iwanami et al. | |
| 6,788,809 B1 | 9/2004 | Greszczuk | |

(Continued)

FOREIGN PATENT DOCUMENTS

JP       10162151       6/1998
WO    WO2006105094    10/2006

OTHER PUBLICATIONS

Javier Romero; H. Kjellstrom, Danica Kragic. "Hands in Action: Real-Time 3D Reconstruction of Hands in Interaction with Objects". Issue date May 3-7, 2010. Robotics and Automation (ICRA), 2010 IEEE International Conference, pp. 458-463.

(Continued)

*Primary Examiner* — Hadi Akhavannik
(74) *Attorney, Agent, or Firm* — Soquel Group LLC

(57) ABSTRACT

Image based operating systems and methods are provided that identify objects in video data and then take appropriate action in a wide variety of environments. In some embodiments, the image based operating systems and methods allow a user to activate other devices and systems by making a gesture.

6 Claims, 16 Drawing Sheets

(56) References Cited

U.S. PATENT DOCUMENTS

| | | | |
|---|---|---|---|
| 6,804,396 | B2 | 10/2004 | Hgaki |
| 7,046,232 | B2 | 5/2006 | Inagki |
| 7,058,204 | B2 | 6/2006 | Hildreth et al. |
| 7,079,674 | B2 | 7/2006 | Paragios et al. |
| 7,274,803 | B1 | 9/2007 | Sharma |
| 7,379,563 | B2 | 5/2008 | Shamaie |
| 7,487,524 | B2 | 2/2009 | Miyamori |
| 7,519,201 | B2 | 4/2009 | Yang |
| 7,586,502 | B2 | 9/2009 | Festejo |
| 7,606,411 | B2 | 10/2009 | Venetsky et al. |
| 7,689,521 | B2 | 3/2010 | Nodelman et al. |
| 7,729,510 | B2 | 6/2010 | Zakrzewski et al. |
| 2002/0024500 | A1 | 2/2002 | Howard |
| 2002/0046347 | A1 | 4/2002 | Murase et al. |
| 2002/0181773 | A1 | 12/2002 | Higaki et al. |
| 2003/0030638 | A1 | 2/2003 | Astrom |
| 2003/0076293 | A1 | 4/2003 | Mattson |
| 2003/0093200 | A1 | 5/2003 | Gutta et al. |
| 2003/0138130 | A1 | 7/2003 | Cohen et al. |
| 2003/0156756 | A1 | 8/2003 | Gokturk et al. |
| 2003/0214524 | A1 | 11/2003 | Oka |
| 2003/0227439 | A1 | 12/2003 | Lee et al. |
| 2005/0117801 | A1 | 6/2005 | Davis |
| 2005/0207622 | A1* | 9/2005 | Haupt et al. ............. 382/118 |
| 2006/0034484 | A1 | 2/2006 | Bahlmann et al. |
| 2006/0170769 | A1 | 8/2006 | Zhou |
| 2007/0136034 | A1 | 6/2007 | Kim et al. |
| 2008/0118106 | A1 | 5/2008 | Kilambi |
| 2008/0123968 | A1* | 5/2008 | Nevatia et al. ............. 382/228 |
| 2008/0240515 | A1* | 10/2008 | Uno et al. ............. 382/115 |
| 2008/0298643 | A1 | 12/2008 | Lawther |
| 2008/0310725 | A1 | 12/2008 | Kurata |
| 2009/0252423 | A1 | 10/2009 | Zhu et al. |
| 2010/0092079 | A1 | 4/2010 | Aller |
| 2010/0232671 | A1 | 9/2010 | Dam |

OTHER PUBLICATIONS

Wong Chuan Ern, Ong Teong Joo. "Moving Object Recognition Using Improved RMI Method" Faculty of Information and Communication Technology Universiti Tunku Abdul Rahman, (2010) pp. 2675-2681.

Masauki, Yokoyama, Tomaso Poggio. "A Contour-Based Moving Object Detection and Tracking" Published in Proceeding ICCCN '05 Proceedings of the 14th International Conference on Computer Communications and Networks; pp. 271-276; ISBN: 0-7803-9424-0 (1995).

Kemmotsu, K., Tomonaka, T., Shiotani, S., Koketsu, Y., Iehara, M., "Recognizing Human Behaviors with Vision Senors in Network Robot Systems"., The Ist Japan-Korea Joint Symposium on Network Robot Systems (JK-NR2005), Nov. 25, 2005. Robotics and Automation, 2006. ICRA 2006. Proceedings 2006 IEEE International Conference on May 15-19, 2006; pp. 1274-1279.

Dedeoglu, Y., "Moving Object Detection, Tracking and Classification for Smart Video Surveillance" A Thesis Submitted to the Department of Computer Engineering and the Institute of Engineering and Science of Bilkent University (Aug. 2004).

Keskin, C., Akrun, E.L. Real Time Hand Tracking and 3D Gesture Recognition for Interactive Interferences using HMM (2003).

Freeman, W.T., Weissman, C.D., "Television Control by Hand Gestures". TR94—Dec. 24, 1994, IEEE International Workshop on Automatic Face and Gesture Recognition, Zurich, Jun. (1995). pp. 1-6.

Starner, T., Pentland, A., "Real-Time American Sign Language Recognition from Video Using Hidden Markov Models"., M.I.T. Media Laboratory Perceptual Computing Section Technical Report No. 375. An earlier version appeared ISCV '95., pp. 1-7.

Richard O Duda et al, Pattern Classification Passages, 2001, Pattern Classification, New York, John Wiley & Sons, US, 164-188, 537.

Duda R O et al., Pattern Classification—the Design Cycle, 2001, Pattern Classification, New York, John Wiley & Sons, US, 14-17.

W Gao et al., Video Scene Analysis: A Machine Learning Perspective In: Video Segmentation and Its Applications, 2011, Springer.

Gael Jaffre et al., Improvement of a Temporal Video Index Produced by an Object Detector, Sep. 5, 2005, Computer Analysis of Images and Patterns: 11th International Conference, CAIP 2005, Versailles, France, Sep. 5-8, 2005, Proceedings [Cture Notes in Computer Science, 3691], Springer, Berlin, DE, 472-479.

Annex to Form PCT/ISA/2006, Communication Relating to the Results of the Partial International Search, PCT/EP2013/051488, Apr. 24, 2013.

* cited by examiner

SYSTEMS, METHODS AND COMPUTER PROGRAM PRODUCTS FOR IDENTIFYING OBJECTS IN VIDEO DATA

FIELD OF INVENTION

The present invention is directed to computer vision technologies.

BACKGROUND

Identifying moving objects in video data is an important task in many computer-vision applications, such as video surveillance, traffic monitoring and analysis, human detection and tracking, and gesture recognition. Often in order to identify objects these applications use background discrimination, where the objects of interest (e.g., those in the foreground) are isolated from objects that are not material to analysis (e.g., those in the background). However, applications that rely on background discrimination tend to be computationally intensive, difficult to implement with only a single camera in real time, and potentially unreliable.

Other known computer vision applications use complex and costly three dimensional or depth oriented sensor systems that detect the shape of an object in order to identify it. Unfortunately, when these systems are used, the sensors must be placed at a certain distance for there to be proper identification, and they poorly recognize objects when the objects are placed in different environments or at distances for which the cameras are not configured, for example, long distances (e.g., 20 M or greater) or short distances (e.g., 50 cm or less). Moreover, at the present time, good two-dimensional cameras have a resolution of only 1920×1024, and depth oriented cameras have a resolution of only 320×240. Additionally, the power consumption of depth oriented cameras can be very high if for example, they use a time of flight methodology, because this requires high speed electronics, which are known to require significant energy.

Still other computer vision applications use special lighting, background, or clothing (e.g., gloves, patches, etc.) to enhance tracking of an object to be identified. However, even with these aids the applications are fraught with false positive results and often misidentify an object and its position in video data. Further, in the case where special clothing is used, the user may not be compliant.

The limits on known technologies often require a tradeoff to be made between the competing goals of capturing all objects for which the system is looking, while not registering a positive result for objects for which the system is not looking. As persons of ordinary skill in the art will recognize, with known technologies increasing the sharpness of discrimination of detection may cause a system to miss a candidate sought to be detected; while increasing the loose aspect of detection may create too many false detections. False detection may occur, for example, because of a superficial similarity to an object intended to be detected. An example of false detection is the coincident appearance of the shadow of a hand and the hand itself. A missed detection may occur, when a condition in the frame renders detection of the object difficult. For example, when there is a change in lighting conditions, or noise is introduced in the image, such as leaves moving in the background of the image on a windy day, there may be impedance of detection of the target object.

As the foregoing illustrates, there is a need for improved image based operating systems and methods that consistently and reliably identify objects in video data.

SUMMARY

Image based operating systems and methods are provided that identify objects in video data and based on the identification are able to take appropriate action in a wide variety of environments. These technologies may for example make use of a single axis of view (single camera), which can employ a relatively simple apparatus (e.g., a web camera) for identification of an object in video data. Instructions for the methods may be embodied in one or more protocols and stored in one or more computer program products. Through the execution of the methods, there may be a transformation of data that is stored in new or transformed data files.

According to a first embodiment, the present invention provides a method of identifying an object in a feed of images, the method comprising the steps of: (a) analyzing a plurality of sequential frames from a feed of frames; (b) partitioning each frame into one or more grid areas, wherein each grid area comprises a plurality of unit areas; (c) applying to each unit area a plurality of detectors, wherein each detector is associated with a different aspect of an object; (d) extracting the likelihood and position for each detector for each unit area thereby forming extracted data; (e) constructing a matrix across said plurality of sequential frames, wherein said matrix comprises said extracted data in a plurality of cells and a first axis of the matrix corresponds to one or more unit areas and one or more detectors as a applied to each unit area within a frame and a second axis corresponds to the relative frame number; (f) determining a probability of the presence of an object, wherein the probability is determined by comparing a snapshot of a plurality of data entries corresponding to information from a plurality of frames to a trained set of data and wherein if the probability is above a threshold level an object is identified.

According to a second embodiment, the present invention provides a method of identifying an object in a feed of images, wherein the method comprises the steps of: (a) receiving video data, wherein the video data corresponds to a plurality of frames of sequential images; (b) identifying a set of candidate objects from within the feed of sequential images, wherein the identifying comprises applying a recognition operation to data corresponding to a subset of images from at least two of the plurality of frames to generate an individual recognition score for a plurality of candidate objects for one or more of the subset of images in which a candidate object is present; (c) aggregating the recognition scores of a plurality of candidate objects that appear in a plurality of subsets of images across said at least two of the plurality of frames to generate an aggregate score for each object, wherein the aggregate score indicates a relative likelihood of presence of an object in the video data; (d) obtaining a subset of candidate objects based on said aggregate scores; and (e) comparing a change in aspect of at least one of the subset of candidate objects across said at least two of the plurality of frames to an established scenario of transformation of aspect, thereby determining an object probability score for each of one or more candidate objects from the subset, wherein an object probability score reflects the probability of the presence of an object in the video data.

The aforementioned method is described as being applied to at least two of the plurality of frames in steps (b), (c), and (e). However, as persons of ordinary skill in the art will recognize, in this method and in other embodiments disclosed herein, the data may become more reliable and valuable if analysis occurs across at least 5, at least 10, at least 20, at least 50, or at least 100 frames, e.g., 5-500 or 10 to 200 or 20 to 100 frames.

According to a third embodiment, the present invention provides an image based operating system comprising: a camera; and a computer in data connection with the camera, the computer containing or being in communication with an executable computer program code for implementing one or more of the methods disclosed herein and a module for outputting the results of the method, wherein if a threshold probability of presence is met the results indicate that an object has been identified.

According to a fourth embodiment, the present invention provides a computer readable non-transitory storage medium storing instructions that, when executed by a computer, causes the computer: (a) to receive video data, wherein the video data corresponds to a plurality of frames of sequential images; (b) to apply a recognition operation to data corresponding to a subset of images from at least two of the plurality of frames to generate a recognition score for a plurality of candidate objects for one or more of the subset of images in which a candidate object is present; (c) to aggregate the recognition scores of a plurality of candidate objects that appear in a plurality of subsets of images across the at least two of the plurality of frames to generate an aggregate score for each object, wherein the aggregate score indicates a relative likelihood of presence of an object in the video data; (d) to obtain a subset of candidate objects based on the aggregate scores; and (e) to compare a change in aspect of at least one of the subset of candidate objects across the at least two of the plurality of frames to an established scenario of transformation of aspect, thereby determining an object probability score for each of one or more candidate objects from the subset, wherein an object probability score reflects the probability of the presence of an object in the video data. The computer program product may thereby create an output that is displayed to a user on for example a computer screen or in paper form. Alternatively or additionally, the computer program product may cause the creation of a data file or the transformation of a data file that includes information that reflects the likelihood of the presence of one or more objects in the video data. Additionally, the computer program product may be configured to iteratively reanalyze frames or to recalculate aggregate scores based on incoming or newly analyzed information in order to revisit whether a threshold criterion of a sufficiently high aggregate score has been met, and/or the confidence interval with which it has been met.

According to a fifth embodiment, the present invention provides a method of identifying an object in a feed of images, the method comprising the steps of: (a) analyzing a plurality of sequential frames from a feed of frames; (b) selecting in each frame, one or more unit areas of interest; (c) applying to each unit area a plurality of detectors, wherein each detector provides a value expressing one aspect of a target object; (d) assembling data in a sample vector, wherein the data comprises a plurality of components and each component is the individual value outcome of a given detector applied on a given unit area from a given frame; and (e) evaluating the performance of the sample vector by counting in the vicinity of the sample vector, all vectors known with the target object to form a first count, and counting all vectors known with or without the target object, as acquired during a training phase to form a second count, wherein the ratio of the first count to the second count estimates the probability of the presence of the target object. In some embodiments, the target is a global target, which is a target with many features that may be separately analyzed such as a hand of human body, and each feature is a subpart into which the global target may be decomposed. In these cases, final determination may involve comparison to a data set trained on global targets.

In some embodiments, the present invention implements a protocol that provides a hierarchical analysis of data. For example, data may be analyzed first by applying sufficiently broad criteria to identify a class of candidate objects, and these broad criteria may be independent of one or more of the size of the object in the frame, the orientation of the object in the frame or the configuration of the object in the frame. Next there may be analysis of the objects within the class to obtain a subclass of candidate objects, wherein this analysis applies criteria that correspond to one or more possible attributes of the objects in the class, such as orientation, configuration and size. These aforementioned criteria that define the class and subclass may be used to derive pre-kinetic information and may be used to determine whether to obtain recognition scores and what those recognition scores are. The recognition scores that are derived from pre-kinetic information can be aggregated across a plurality of frame. Subsequent kinetic analysis may also be performed.

Additional features and advantages of various embodiments will be set forth in part in the description that follows, and in part will be apparent from the description, or may be learned by practice of various embodiments. The objectives and other advantages of various embodiments will be realized and attained by means of the elements and combinations particularly pointed out in the description, figures and appended claims.

BRIEF DESCRIPTION OF THE FIGURES

In part, other aspects, features, benefits and advantages of the embodiments will be apparent with regard to the following description, appended claims and accompanying figures where:

Figure 1:
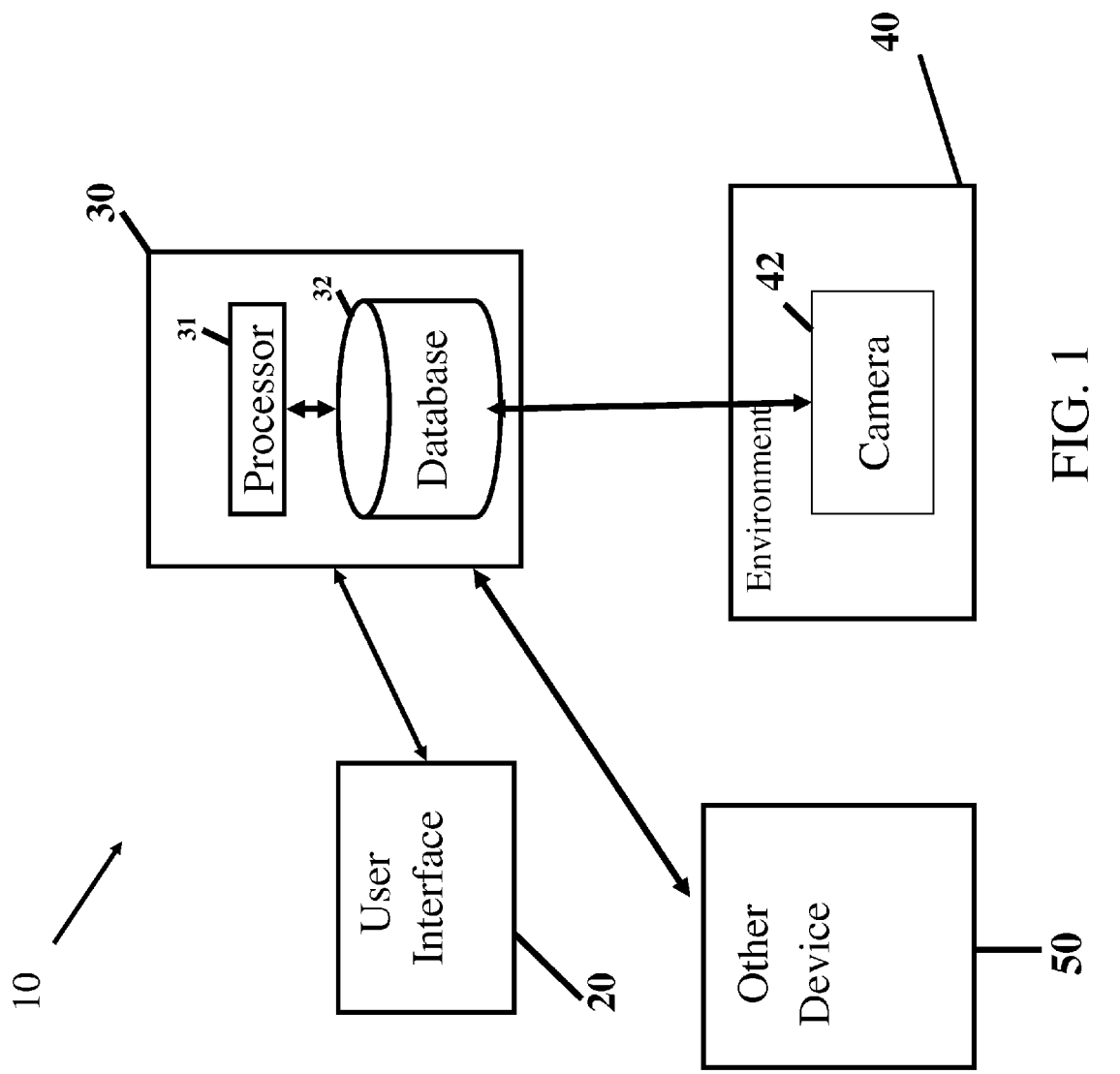
FIG. 1 illustrates system architecture according to an embodiment of the image based operating system of the present invention.

It is to be understood that the figures are not necessarily drawn to scale. Further, the relation between objects in a figure may not be to scale, and may in fact have a reverse relationship as to size. The figures are intended to bring understanding and clarity to the structure of each object shown, and thus, some features may be exaggerated in order to illustrate a specific feature of a structure.

DETAILED DESCRIPTION

For the purposes of this specification and appended claims, unless otherwise indicated, all numerical values used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "1 to 10" includes any and all sub-ranges between (and including) the minimum value of 1 and the maximum value of 10, that is, any and all sub-ranges having a minimum value of equal to or greater than 1 and a maximum value of equal to or less than 10, e.g., 5.5 to 10.

It is also noted that, as used in this specification and the appended claims, the singular forms "a," "an," and "the," include plural referents unless expressly and unequivocally limited to one referent. Thus, for example, reference to "a database" includes one, two, three or more databases.

Reference will now be made in detail to certain embodiments of the invention, examples of which are illustrated in the accompanying drawings. While the invention will be described in conjunction with the illustrated embodiments, it will be understood that they are not intended to limit the invention to those embodiments. On the contrary, the invention is intended to cover all alternatives, modifications, and equivalents that may be included within the invention as defined by the appended claims.

Image based operating systems and methods are provided that identify objects in video and/or activity of the objects. After identifying the object, or objects and/or activity of the object or objects, the system can cause appropriate action to be taken in a wide variety of environments. In some embodiments, the image based operating systems and methods allow a user who is the subject of the video or person who controls the action in the video to activate other devices and systems by making a gesture without directly interfacing with the other devices and systems.

The systems and methods may be carried out by equipment such as a camera and a computer. In some embodiments of the present application, only a single axis of view (single camera) is used, which allows the use of a relatively simple apparatus (e.g., a web camera) for identification of the object in video data. In other embodiments a plurality of cameras are used that have either overlapping or non-overlapping fields of view. Each camera may be stationary or able to move or to rotate. Additionally, each camera may have the ability to change its field of view by zooming in or out.

According to one embodiment, the present invention provides a method of identifying an object in a feed of images. An "object" is any thing, or a thing with one or more specific attributes, or any thing with or without the attributes as engaged in one or more actions. The phrase "feed of images" refers to a plurality of images that when viewed in sequence are interpreted as a progression over time of a scene, the background of which may be constant or variable. The number of images and speed at which they are played back will determine the duration of the video that the feed produces. Within the feed of images, each image that corresponds to a scene from the same point in time may be referred to as a frame. The feed of images may be recorded in analog or digital format. If the feed of images is in analog format or a portion of the feed is in analog format, preferably the images are converted to digital format for further processing.

Under this method, a device or system receives the feed of images as video data or converts it into video data. The video data may enter an analysis phase continuously in real time, continuously after a short delay or after having been captured, stored and then transmitted in toto. Conversion may occur at the camera or at a computer that receives data from the camera. If conversion occurs at the camera, then the camera contains a central processing unit equipped to carry out the conversion.

During processing, the video data may be filtered. By filtering the video data, one may convert it to a form that permits easier analysis because of for example, the removal of artifacts and/or conversion into a black and white, or black, white and gray scale.

From the video data that corresponds to the feed of images, the device or system identifies a set of candidate objects. This step may be automated, and identification may be by means of applying of a recognition operation. The recognition operation may for example, divide a frame into a grid and conduct a high level review of the data within each cell (also referred to as a unit area) in order to look for lead candidate objects. Alternatively or additionally it may first search for regions that contain one or more pieces of data that correspond to an attribute of an object of interest and then conduct further processing over an area as defined by a radius from the identified locus or loci of interest. Thus, the recognition operation is a protocol for analyzing individual frames or sections of frames in order to determine whether the data that is captured is consistent with data that would represent an object of interest. It may be applied simultaneously or sequentially to different frames and it may be applied simultaneously or sequentially to different areas of a frame. The recognition operation may, for example, when looking in an area initially described as being of potential interest look for areas of predefined levels of contrast that are arranged in a pattern that may be indicative of an object of interest.

When each frame is divided into smaller areas for analysis, each smaller area may be viewed as containing a subset of images. Thus, the protocol may first look for subsets of images of interest by applying a high-level (low threshold) set of criteria and then focusing within the subsets of images in order to analyze the data to determine whether and to what degree within a frame the data is consistent with the presence of an object. As a person of ordinary skill in the art will recognize, if the initial allocation of the subsets of areas is made independently of the location of an object of interest in a frame, for an area of contrast of interest, it may be necessary to combine the information from a plurality of a subsets of images within a frame in order to provide sufficient information to obtain a desired level of confidence as to whether and where an object of interest is present in a frame.

If a set of data that meets a predefined number of criteria with a predefined level of confidence is found, it may be assigned an individual recognition score. For any one frame, there may be no objects of interest that warrant assignment of an individual recognition score, or there may be only one object of potential interest or a plurality of objects of potential interest, or there may be many objects of a sufficient quality to require further investigation.

Next under the method, one aggregates the recognition scores of one or a plurality of candidate objects that appear in a plurality of subsets of images across a plurality of frames to generate an aggregate score for each object. Associated with the aggregation data may be the number of frames in which recognition scores have been aggregated and/or the span of frames across which they have been aggregated. Thus, if aggregation occurs across 50 frames, but in ten of those frames there is no recognition score, the system may note both the number 50 as the span of the frames, and 40 as the number of frames in which there is a recognition score.

Methods of aggregation are known by persons of ordinary skill in the art. By way of non-limiting examples, aggregation can be accomplished by a sum of the squares difference between an ideal target and found scores, non linear or non continuously monotonic analysis, feedback from additional intelligence based on the context of image, fuzziness factor or global illumination, or combinations thereof.

Thus, an aggregate score indicates a relative likelihood of the presence of an object in the video data not merely in one frame. This aggregation step may be automated and may commence immediately after completion of the previous step or it may be begun before completion of the prior step. By way of example, after an individual recognition score of sufficient value is found in one frame or a plurality of frames (e.g., at least two, at least three, at least five, at least ten, or at least twenty frames) that are sequential, the aggregation step may commence while search for candidates objects with sufficiently high recognition scores continues. Additionally and as persons of ordinary skill in the art will recognize, the data analysis may suggest that an object is present in only e.g., 70% or 80% or 90% of a series of sequential frames. However, this may mean that in some frames the object has become obscured and/or is in a configuration that the computer is not configured to recognize with sufficient confidence.

After aggregation, one obtains a subset of candidate objects based on the aggregate scores. Thus, whereas a threshold recognition score screening may be one means by which to weed out data or to hone in on likely candidates, requiring a sufficiently high aggregation score may be another means. These two steps may be used together or independently. Obtaining and analyzing recognition scores and aggregate scores may each be an iterative process. Thus, if a result does not suggest the presence of an object in one frame or across a plurality of frames, further analysis may be performed in order to provide more detailed information. By iteratively reviewing the data, the methods and systems can avoid unnecessary work when clear detections are made, while also probing deeper when analyses are inconclusive, or higher levels of confidence are sought.

The method may also comprise a step of comparing a change in aspect of at least one of the subset of candidate objects across a plurality of frames to an established scenario of transformation of aspect (e.g., movement or change in position, orientation or size). This comparison, which like all other steps may be automated, may allow for the determination of an object probability score for each of one or more candidate objects from the subset. The object probability score reflects the probability of the presence of an object in the video data, and the highest object probability score indicates the data that most likely suggests the presence of an object. Thus, rather than focus on whether there is data that suggests an object in each of a plurality of frames, this analysis considers whether the behavior across frames (e.g., movement or activity) changes in a manner that is consistent with known behaviors for the object of interest. Accordingly, it can be used as further evidence of the presence of an object and/or as a query as to the behavior of the object.

In some embodiments, what is of interest is not the mere existence of an object, but the appearance of the object when previously there was none. In these embodiments, there may be a step in which an appearance of an object is detected based on at least a presence of a high-ranking recognition score for a candidate object from one frame combined with an absence of a high-ranking recognition score for a corresponding image from a second frame. Thus, recognition scores may provide information of significance beyond their contribution to aggregate scores.

As with any step in which data is compared to a standard, the standard may be stored locally or remotely, and be in a form that is accessible by a computer program product that comprises an algorithm for such comparison. Thus, the protocols of the method may be designed to retrieve and to analyze data in a manner that enables the methods to be performed.

Because objects in real life are three dimensional and exist over time, and video data is a representation of these objects, in some embodiments it may be advantageous to represent one or more of the relative positions and orientations by a vector. Thus, in some embodiments, the method further comprises calculating an absolute value of the difference between a first vector and a second vector, wherein the first vector defines a relative position of an object in a first frame, and a second vector defines a relative position of the object in a second frame, thereby determining if there was movement of the object.

When analyzing movement of a candidate object from within a subset of candidate objects across a plurality of frames, one may use a method that verifies that the movement conforms with a particular kinetic pattern so as to generate a verified object behavior. The kinetic pattern may comprise any of a defined path or set of paths, a change in size, or a change in rotation, or any combination thereof. Still further, the method may provide a signal based on the verified object behavior to a computer or other device. This signal may for example, set another action in motion, e.g., sounding of an alarm or change in position of the camera that supplied the video feed or activation of another camera to track the object as it leaves the field of view that supplied the initial video feed.

According to another embodiment, the present invention provides an image based operating system, comprising: a camera located in an environment; and a computer in data connection with the camera. The camera may for example be a camera that is capable capturing images in digital format to form video data. The camera may be activated by a human or automatically in response to for example, input from a motion sensor or a heat sensor. The video data may be stored locally on the camera and/or transmitted wirelessly or by wired attachment to the computer. The data can alternatively be stored on a portable data transportation device such as a thumb drive that is manually moved from the camera to the computer. Still further, in some embodiments, the computer and the camera may be contained within the same housing and optionally are in constant communication through circuits within the housing.

The computer may also be in communication with an executable computer program product for implementing any of the methods described herein. The computer program product may comprise a module for outputting the results of the method, wherein if a threshold probability of presence is met, the results indicate that an object has been identified. The computer program product may also be designed such that after an object has been identified with sufficient probability, the image based operating system causes another system to activate or to deactivate.

Examples of systems that the image based operating system may activate include but are not limited to at least one of a security system, an alarm system, a communications system, an automated teller system, a banking system, a safe, another camera system, a speaker system, a microphone, another computer, a server, a laptop, a handheld computer, a bluetooth enabled device, an entertainment system, a television, a recorder, an appliance, a tool, an automobile system, a transportation system, a vehicle system, a sensor, an emitter, a transmitter, a transceiver, an antenna, a transponder, a gaming system, a computer network, a home network, a local area network, a wide area network, the Internet, the worldwide web, a satellite system, a cable system, a telecommunications system, a modem, a telephone, a cellular phone, or a smart phone.

In some embodiments, the image based operating system is capable of identifying a characteristic in the candidate image and taking an action based on the characteristic. For example, the object may be a hand that is identified, but the system may only take action when the hand makes a particular gesture, e.g., a fist, an open palm, a thumbs up sign or thumbs down sign, an okay sign, at least one finger, or a hand motion, or the object may be another body part and the gesture may be a head motion, a lip motion, or an eye motion. Alternatively, a plurality of gestures such as those that would form a sentence in American Sign Language must be made prior to action being taken. When action is taken only after receiving input that corresponds to a plurality of gestures, the system may require that the gestures be made in a particular order as a prerequisite to taking an action or the order may be irrelevant. By way of further example, the characteristic may be at least one of: movement of an item in an environment; movement of an item into an environment; movement of an item out of an environment; appearance of an item in an image; movement of a hand, finger, limb, head, neck, face, shoulder or a gait of a person; action of a pet; action of a child; action of a person with special needs; or action of an elderly person.

As noted above, the camera may be placed in an environment. The term "environment" refers to a location and may be a natural or man-made setting. The computer may be located in the same environment or be located remotely from the environment. By way of example, the environment is at least one of an airport, an airplane, a transportation venue, a bus, a bus station, a train, a train station, a rental car venue, a car, a truck, a van, a workplace, a ticketed venue, a sports arena, a concert arena, a stadium, a sports venue, a concert venue, a museum, a store, a home, a pool, a gym, a health club, a golf club, a tennis club, a parking lot, an ATM, a storage location, a safe deposit box, a bank, or an office.

By way of another non-limiting example, the environment may be a home and the system may be used to control access to all or parts of the home based on matching a hand gesture. By way of a still further non-limiting example, the system triggers an alarm and the object that has been identified is at least one of an intruder, smoke, fire, water, proximity of a child to a dangerous condition, or proximity of an elderly person to a dangerous condition.

The image based operating system may also be used in applications that provide alerts of one or more events that are likely to occur, e.g., based on the observed trajectories or behavioral patterns of one or more objects and the anticipated behavior of those one or more objects. Thus, the image based operating system may be configured such that it is capable of identifying a first object that is in close proximity to a second object and is about to collide with the second object. As persons of ordinary skill in the art will recognize, either the first object or the second object or both objects may be moving.

According to another embodiment, the present invention provides a computer readable non-transitory computer readable storage medium storing instructions. A "non-transitory tangible computer readable storage medium," includes hardware, software or a combination of the two as stored on for example, a hard drive, a hard disk, a floppy disk, a thumb drive, a computer tape, ROM, EEPROM, nonvolatile RAM, CD-ROM or a punch card or combinations thereof. The information may be stored in the form of computer code that is readable or possible of being converted into a form that is readable by the computer.

The data of the present invention may be stored in the computer or remotely. Thus, it may be stored in the same location as or in a different location from the computer program product on another hard drive, a portable device or in a computing cloud.

The computer program product may cause or permit the computer to receive video data. As with the previous embodiment, the video data corresponds to a plurality of frames of sequential images. In some embodiments, upon receipt, the video data is filtered or otherwise processed to facilitate application of a recognition operation.

After receipt some or all of the frames of the video data, the computer program product applies a recognition operation. As noted above, a recognition operation facilitates identifying objects in the video data. Thus, it may cause the computer to analyze data corresponding to a subset of images from a plurality of frames to generate a recognition score for a plurality of candidate objects for one or more of the subset of images in which a candidate object is present. The operation may analyze the data by dividing each frame into smaller areas and examining each area. By way of non-limiting examples, the computer program product may divide each frame into 4 or 16 or 64 or 256 areas of equal size, analyze pixel patterns and/or light intensities and determine if a candidate object might be present within each area or across two or more adjacent areas. If there is sufficient evidence to suggest the presence of an object within a frame, a recognition score is assigned for that candidate object for that frame. This information may be stored in a data file with sufficient identifiers to permit future retrieval by the computer program product and association with the frame to which it applies.

Next, the computer program product causes the aggregation of the recognition scores of a plurality of candidate objects that appear in a plurality of subsets of images or frames across at least two of the plurality of frames to generate an aggregate score for each object. Because objects typically do not exist only for enough time to be captured in only one frame, and in any one particular frame their forms and/or orientations can exist in a manner such that in that frame any given object might not satisfy defined criteria for assignment of a recognition score, or it might receive assignment of a recognition score that is either artificially high or artificially low, it is advantageous to aggregate the recognition scores across a plurality of frames (e.g., at least 2, at least 5, at least 10, least 20, at least 50, at least 100, 2-500, 2-200, 5-150, or 50-100) in order to provide an aggregate score. This aggregate score indicates a relative likelihood of the presence of an object in the video data.

Thus, the computer program product may analyze the aggregate scores and obtain a subset of candidate objects based on the aggregate scores, looking for the highest aggregate score or scores, thereby potentially providing a smaller number of candidate objects for processing or at least for further processing. If none of the members of this subset satisfy the criteria applied for further processing, additional already accumulated data can be analyzed or additional data from the same frame or additional or different frames can be analyzed, and/or a lower criterion of aggregate scores can be applied in order to initiate the further processing.

The further processing may include an analysis of the behavior of a candidate object across a plurality of frames. For example, it may comprise, consist essentially of or consist of comparing a change in aspect of at least one of the subset of candidate objects across a plurality of frames to an established scenario of transformation of aspect, thereby determining an object probability score for each of one or more candidate objects from the subset. The probability score reflects the probability of the presence of an object in the video data (which may correspond to one or more of its physical presence, features of the object such as orientation, size or configuration, movement or movement pattern). The probability score may be saved to a data file, output to a user, or transmitted to another system. The output may be in the form of an object identifier that states the presence of any object if the probability presence is above a predetermined level. Any output may further comprise a confidence interval.

Furthermore, when there is a plurality of candidate objects, e.g., at least two, at least three, at least five, at least ten, at least twenty, etc., the output may be presented in an ordered format that includes or excludes the probability. Additionally, although the various embodiments are described above as being of use in connection with identifying one type of object, persons of ordinary skill in the art will readily recognize that analyses can simultaneously be performed to look for more than one type of object or a combination of objects.

According to another embodiment, the present invention provides a method of identifying an object in a feed of images. The method comprises the steps of: (a) analyzing a plurality of sequential frames from a feed of frames; (b) partitioning each frame into one or more grid areas, wherein each grid area comprises a plurality of unit areas; (c) applying to each unit area a plurality of detectors, wherein each detector is associated with a different aspect of an object; (d) extracting the likelihood and position for each detector for each unit area thereby forming extracted data; (e) constructing a matrix across the plurality of sequential frames, wherein the matrix comprises the extracted data in a plurality of cells and a first axis of the matrix corresponds to one or more unit areas and one or more detectors as a applied to each unit area within a frame and a second axis corresponds to the relative frame number; (f) scoring each cell; and (g) optionally, determining an aggregate score of each column, wherein the aggregate score reflects the probability of the presence of an object in a frame and said probability is obtained by comparison of data in each column to a trained set of data and wherein if the probability is above a threshold level an object is identified.

In this method, there may be a plurality of sequential frames that are received by a computer as digital or analog data. A computer may apply a set of criteria that permit the automated partitioning of each frame into one or more grid areas. Each grid area may comprise a plurality of unit areas. The unit areas may or may not be of a uniform size.

To each unit area, the computer may apply a plurality of detectors. A detector is a set of criteria that may be used to evaluate the likelihood of an object or aspect of an object being present in a unit area and its position. The likelihood is determined by comparing the data to a reference set of data.

The data that is extracted may be referred to as extracted data, and from this data, the computer may create a matrix. The matrix may contain data across a plurality of frames. For example, the matrix may comprise the extracted data in a plurality of cells and a first axis of the matrix corresponds to one or more unit areas and/or one or more aspects within a frame and a second axis corresponds to the relative frame number. The computer may score each cell. Next the system may optionally obtain an aggregate score for each column that reflects the probability of the presence of an object in a frame. The probability is obtained by comparison of data in each column to a trained set of data and wherein if the probability is above a threshold level an object is identified. The system may then consider the data across a plurality of columns (or rows).

As a person of ordinary skill in the art will recognize the methods described herein may benefit from: (1) a set of rules that qualify a good outcome versus a bad outcome, i.e., establishes a threshold over which the weight can be considered as being relevant; and (2) an optimization function that permits one to know when there has been a maximum difference between the results of probing a good target and a bad target. The former may be established by comparing the outcome of a set of good values conceptually against all of the images in a universe. As a matter of practicality, the set of rules may be created based on applying and testing rules in a set of 10,000 to 200,000 images. Deriving rules for the latter may be done concurrently with the analysis for the former. For example one may obtain a set of rules by searching for the choice of the best P-uplet subset (a feature subset that will give the higher outcome for the chosen detector among an N-uplet set (all of the features) that will give the best values set (which is not a single value, but rather the more optimal value set between the good target and any other non-target).

In some embodiments, the aforementioned analysis may be visualized in a matrix made of frame number on the Y axis and a different aspect along the X axis of the same detector. If the data is degraded to a binary condition of 0 if under a threshold and 1 if over a threshold, the matrix may appear as:

$$\begin{matrix} 0 & 0 & 0 & 1 & 1 \\ 1 & 1 & 0 & 1 & 1 \\ 0 & 1 & 1 & 0 & 0 \\ 0 & 0 & 0 & 0 & 0 \end{matrix}$$

In some embodiments, the system may be configured to analyze the matrix in a manner that corresponds to a sliding window over a video stream. Thus, if each row corresponds to a frame and each column corresponds to an aspect, the system may simultaneously consider the data in the cells across a plurality of rows and columns, looking not for cumulative data, but a picture or snapshot of the data across at least 2, at least 3, at least 5, least 10, at least 20, at least 50 columns and/or rows. The analysis may slide by for example considering 20 frames simultaneously, and after considering frame 1 to 20, then considering frames 2 to 21, 3 to 22, etc. The snapshot may be based on the data in the matrix, or prior to conducting the snapshot analysis, one may aggregate data in a column or row and then take a snapshot based on the data across a plurality of rows and/or columns. By taking a snapshot, the system considers not only individual frames and unit areas, but also changes over time. Thus, in some embodiments, it is desirable not to aggregate data. In other embodiments aggregation is desirable to facilitate processing. Aggregation may for example, reflect adding or application of other mathematical formula.

One dimension of the matrix may be referred to as the NF or number of frame, in the other dimension may be the aspect of number of aspect NA. For example, if there are twenty criteria that are used to make up the matrix and there are 7000 frames, the analysis may take a snapshot of the twenty criteria across a plurality, e.g., 5 to 100, 10 to 50 or 20 to 40 frames. The computer may take a sliding snapshot of the matrix thus moving only one column or row (depending on how the matrix is configured) and then comparing each snapshot of the sliding frame to a reference data set. By analyzing sliding frames within a matrix, one may obtain better discrimination than one would obtain with currently employed techniques. For example, rather than looking for a feature of a rectangle in order to infer a window, one may look for both rectangles and the surrounding environment as it appears over time (which may also include rectangles that are not windows, but are buildings) in order to conduct a better analysis of information in a feed.

The number of N-uplets reviewed at a time may depend upon the speed of an object. For example a tennis ball or a bird may move on up to 1000 feet per second, whereas a turtle may more about 2 feet per second. This difference in speed may require that the parameters of the computer be set such that either the size or the rate of the snapshot analyzed be increased or decreased depending on the expected rate of movement of the object. As a person of ordinary skill in the art will recognize, as far as the computer is concerned, the detectors as applied to a frame may work on an arbitrary scale and offset, and that may be applied on various zoom levels. Thus, new matrices may be constructed from different zoom levels.

The quality and reliability of the results obtained using the methods of the present invention may be dependent upon the reference set of data and how the reference probabilities were created. These references may be created during one or more training sessions. Training has the purpose of delivering a probability law of funding a specific vector or matrix. Training may be done on empirically analyzed data until a reliable set of rules with a satisfactory predictive results are obtained. Thus, there may be a learning phase on approximately 100,000 samples of images in order to establish identification rules and the probability that satisfaction of a subset of rules evidence the presence of an object or action.

By way of an example, there may be an embodiment that is directed toward detecting a movement of a human across an area that is captured by a camera. The area set may be defined as being made of three verticals zone, of the same width and full frame height. One may design the system with for example, three different kinds of detectors, which is a typical minimum number of detectors: (i) a movement detector (major change of a majority of pixels); (ii) a cascading deHarr detector (trained for human shape as a vertical body); and (iii) a starr blob detector to analyze the relative size of the biggest continuous blob (a human is a single blob even if of an odd shape). In this case the three detectors complement each other and are of different nature analyzing the same area. As a person ordinary skill in the art will recognize, movement may be detected by comparing information in a unit area to information in the same unit area in a preceding and/or subsequent phase. Furthermore, the minimum number of detectors may be applied simultaneously or one may be applied first and only if a threshold value for that one is reached are the others applied.

Under the parameters of the preceding paragraph, the matrix has nine lines (outcome of three detectors, and three zones) and the number of considered columns depends upon the number of frames that are to be analyzed. This number can be determined randomly or based on experience or a default number, e.g., 3-300.

When there is no human in the field of any of area, the expected value for the matrix should contain a majority of zeros. If the background is e.g., a tree, it may happen that the movement detector will be triggered without a final cause. Thus, one may assume that all values being null is an exceptional case.

Figure 16:
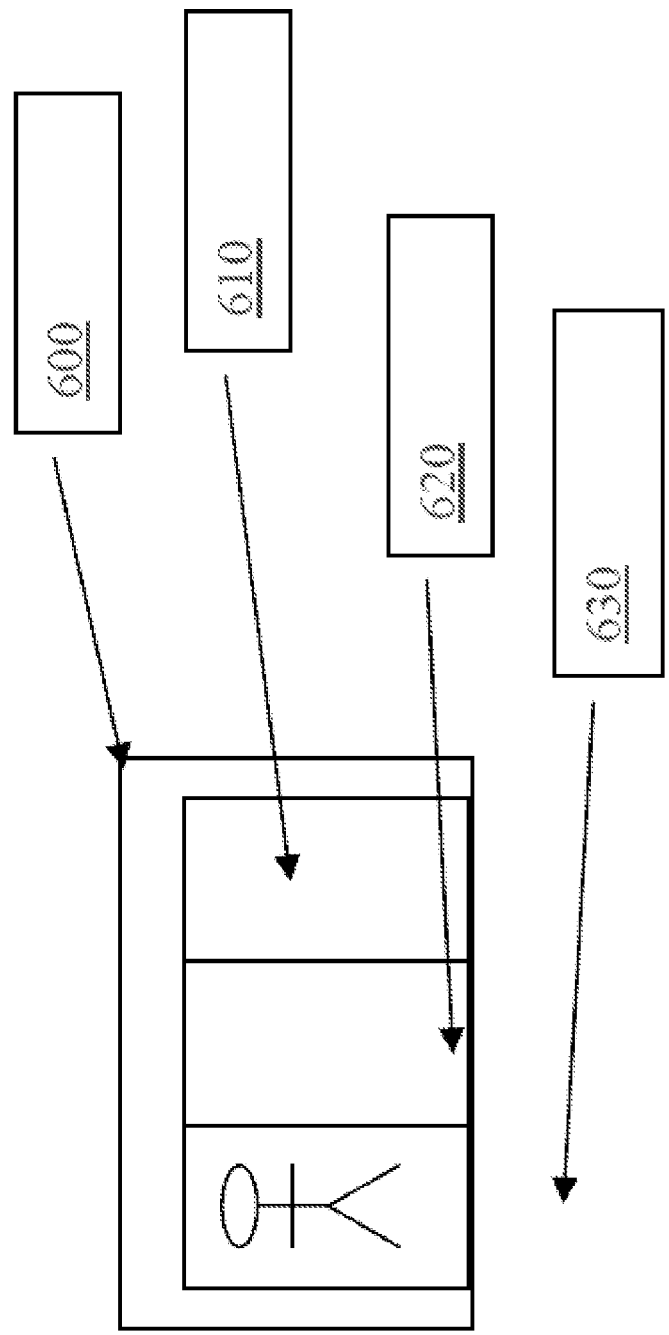
FIG. 16 is a representation of a frame to be analyzed as divided into three unit areas.

When a human moves from left to right in front of a feed, the pattern may look like the matrix below for a subset of three frames of highest importance (other frames will typically show negligible values for each detector). FIG. 16 shows a frame 600 divided into area zone 1, 610, area zone 2, 620, and area zone 3, 630. This creates a $R^{27}$ vector (three detectors over three areas, considered over three frames) arranged in a matrix (also known as vector) that for example can be expressed as:

|  |  | frame: | | |
| --- | --- | --- | --- | --- |
|  |  | 1 | 2 | 3 |
| Move Zone | 1:> | 56 | 78 | 68 |
| Cascade | 1> | 68 | 24 | 45 |
| Starr | 1> | 74 | 7 | 14 |

-continued

|  |  | frame: | | |
|---|---|---|---|---|
|  |  | 1 | 2 | 3 |
| Move Zone | 2> | 30 | 69 | 20 |
| Cascade | 2> | 12 | 67 | 9 |
| Starr | 2> | 23 | 68 | 17 |
| Move Zone | 3> | 27 | 30 | 75 |
| Cascade | 3> | 8 | 18 | 54 |
| Starr | 3> | 16 | 15 | 56 |

Under the analysis described above and shown in the matrix above, a higher value reveals a higher confidence from each detector.

On Zone 1, using a coarse movement detector, if the background of Zone 1 is a tree, a moving analysis does not deliver an accurate outcome. Thus, in the matrix above, one can see that moving detector of area 1 is always high. The value when a human moves in front of it can even be a reverse indication, as fewer pixels are impacted due to for example homogeneity of the cloth that makes pixels of a previous frame already of the same aspect. Hence no fundamental change under this kind of detection would be seen. However, the apparatus benefits directly from this as it is not the outcome of a detector that matters but the way that the detectors behave versus an expected scenario for the expected object.

This matrix pattern then is one of many kinds. The one shown above is from the category of a "positive" human movement. Once training had been done, each sample on input creates a set of points in this R27 space, and each of the samples represents a known outcome. During normal operation then the method delivers a vector for analysis as compared to the pool of points that were analyzed during the training. Thus, the technology allows a person of ordinary skill in the art to find the closest point within the trained set and to deliver the known result for this point, potentially qualifying the confidence by evaluation of the dispersion around this point, as well as the distance to this point.

As a matter of practicality, in some embodiments, the present invention can do its search for similarity using many approaches that have various efficiencies when used with today's computers. In various embodiments, two approaches are of special interest: (i) a search for similarity using a real valued matrix (R27); or (ii) an indexing approach in a 2^27 size memory table. The R27 approach would then require a hashing method to find where a point fits within all sample qualified points.

The 2^27 approach requires for example that each value is in a binary format for example using a threshold. Such a threshold can be the value estimated as the mean between the average value for positive detection and for negative detection as found during training. This thresholding approach is non-limitative and a threshold can be determined also by arbitrary, experimental or known value adequately chosen for each detector. A sample of a matrix using the thresholding approach appears below:

|  |  | frame: | | |
|---|---|---|---|---|
|  |  | 1 | 2 | 3 |
| Move Zone | 1:> | 0 | 1 | 1 |
| Cascade | 1> | 1 | 0 | 0 |
| Starr | 1> | 1 | 0 | 0 |
| Move Zone | 2> | 0 | 1 | 1 |
| Cascade | 2> | 0 | 1 | 0 |
| Starr | 2> | 0 | 1 | 0 |
| Move Zone | 3> | 0 | 0 | 1 |
| Cascade | 3> | 0 | 0 | 1 |
| Starr | 3> | 0 | 0 | 1 |

Applying multiple detections to many training samples will create a set of data that one may qualify by its probability of appearance related to a specific object for which one is looking. Then when in a live feed mode, each outcome of the detectors matrix will be tested against this set of probable outcomes and deliver a qualification of the event. With this information, a confidence factor can be extracted from the dispersion analysis of each positive or negative occurrence.

The aforementioned binary approach is a method of choice with very many sample sets. Under this approach, the search for the vector within the training set is fast and the analysis of the probability density around the point is simplified. Each member of the table is made of a counter of outcomes during positive sample training and a counter of outcomes during negative sample training. The R27 approach requires more complex search techniques and the fact that valuation of a result available allows a finer discrimination, it allows one to consider far fewer samples than in the binary approach.

Figure 2:
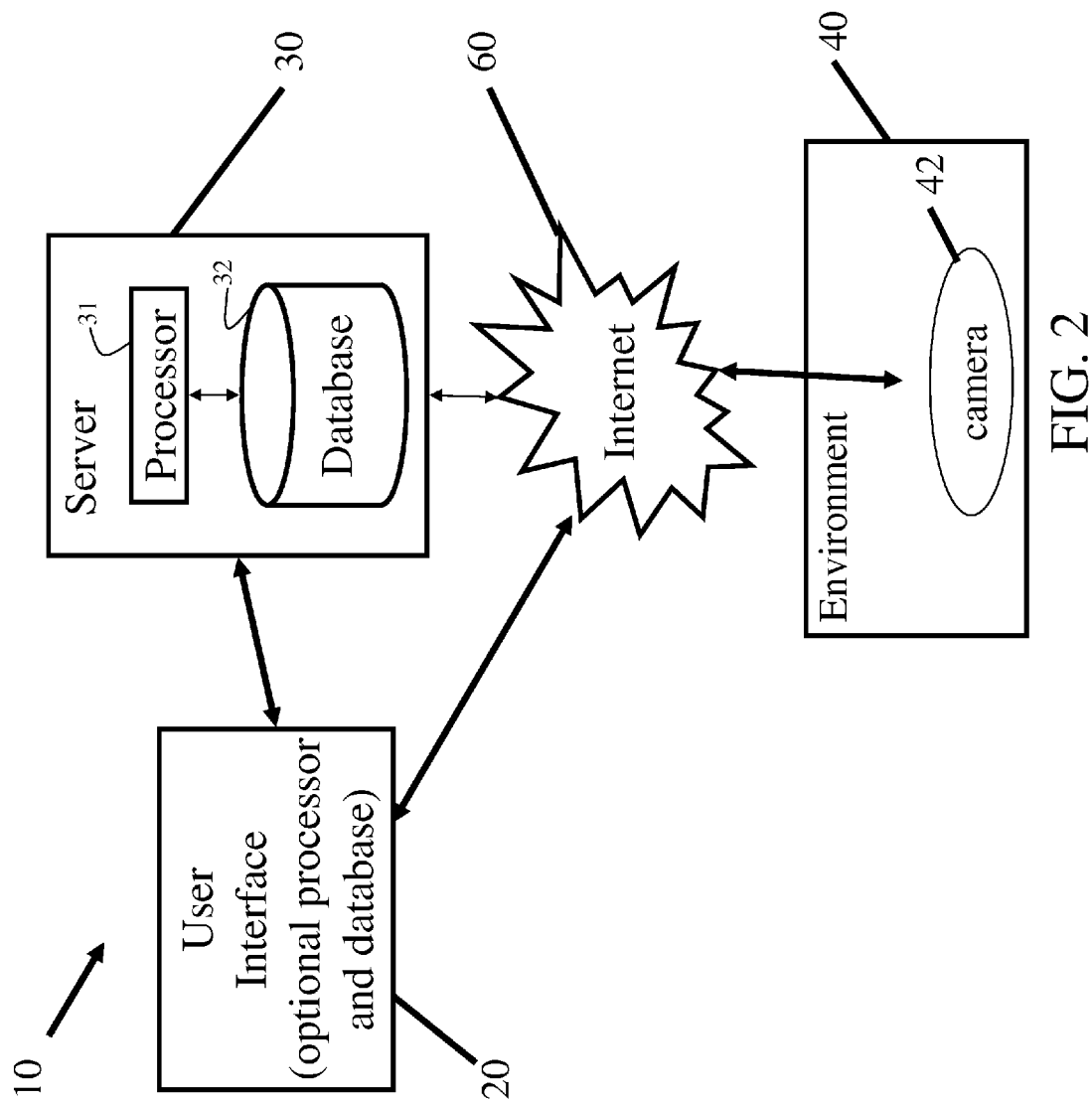
FIG. 2 illustrates system architecture according to an embodiment of the image based operating system that is a network based system.

Various embodiments of the present invention may be further understood by reference to the accompanying figures. FIG. 1 and FIG. 2 illustrate system architectures according to some embodiments of the image based operating system 10 of the present invention. The system may include a computer 30 having one or more databases 32 and processors 31 that are operably coupled to one or more users interfaces 20. The user interfaces may for example be personal computers, mainframes, smart phones, personal digital assistants (PDAs), WebTV, Skype (or other Internet-only) terminals, set-top boxes, cellular/phones, screenphones, pagers, blackberry, iPads, iPhones, peer/non-peer technologies, kiosks, or other known (wired or wireless) communication devices, etc. that preferably are configured to access the world-wide web. They may be used through a graphical user interface (GUI) containing a display, or may be a link to other user input/output devices known in the art.

Users may access and view information stored locally on hard drives, CD-ROMs, DVDs, solid state hard drives; stored on network storage devices through a local area network; or stored on remote database systems through one or more disparate network paths (e.g., the Internet, WIFI (60 in FIG. 2)).

The database 32 may be any one or more of the known storage devices or systems e.g., Random Access Memory (RAM), Read Only Memory (ROM), hard disk drive (HDD), floppy drive, zip drive, compact disk-ROM, DVD, bubble memory, redundant array of independent disks (RAID), Smart Media card, server, network accessible storage (NAS) systems, storage area network (SAN) systems, flash drives, thumb drives, etc. Furthermore, the database may be configured to be protected from access by unauthorized users (e.g., hackers, viruses, worms, spy ware, etc.).

The database may be coupled to the processor for allowing the image based operating system to use the data, to store new data, to manipulate stored data, to search within the database and to retrieve data from the database. The data may be stored as a continuous set of data, segmented to form a contiguous whole, or separated into different segments to reside in and among one or more server databases, as well as partitioned for storage and/or archiving in one or more files to achieve efficiencies in storage, access, and processing of data. The stored information may be stored in one or more database structures for use in their raw, natural, or unmodified data states (e.g., as delivered from the data source). Data may be stored in a variety of formats including document types such as WAV, MPEG, AIFF, WMV, MOV, any other video formats, etc. The server and/or user interfaces may utilize any known processor or processor-based system that typically executes one or more executable instructions or programs stored in the one or more (local or remote) memory devices (or other articles of manufacture). Although the system is described as having a user interface, the system may be designed such that after being set up, it runs even in the absence of input from the user interface and continues to run until an input instructs it to cease running or a predetermined amount of time has expired.

The image based operating system may also comprise a camera 42 in data connection (e.g., wired and/or wireless) with the computer 30. The camera and the computer may be separate devices that form parts of the system or they may be housed within the same device of the system. For illustration purposes, in FIG. 1, they are shown as separate devices.

The camera 42 or similar image-capturing facility (e.g., image sensor), may optionally include further elements, such as a data storage facility and processor. The camera may be capable of being located in a wide variety of environments 40. Additionally, the camera may be any device capable of capturing image data, such as a digital camera, a film camera, a video camera, a movie camera, a beta recorder, a handheld camera, a fixed camera, a motion-sensing camera. The camera captures images in an environment and transmits the images to the computer for analysis.

In some embodiments, the images may be transmitted from the camera to the computer as digital data in the form of one or more data files comprising a plurality of images that correspond to a feed of images. In certain embodiments, the images may be transmitted as an uncompressed file, e.g., a bitmap or RAW format file, or they may be processed or compressed by any method known to those having ordinary skill in the art, including JPEG, JFIF, Exif, TIFF, MPEG, GIF, PNG, H.120, H.261, MPEG-1, MPEG-2, H.262, H.263, MPEG-4, H.264, etc. In other embodiments, image data may comprise vector data. In still other embodiments, the images may be taken by the camera in non-digital form and converted by the image based operating system into digital form for processing.

The camera may be equipped with an interface, to permit its operation. The interface may be a direct user interface for use by a human user, such as a series of buttons, dials, keyboard, mouse, stylus, or touch screen that allows the user to turn the camera on and off, to record image data, to position the lens, to change lens settings, to zoom in or out, to record, and/or to angle the camera.

During operation, the image based operating system may analyze image data from the camera and take appropriate actions in response to those images acquired by the camera. For example, it may activate another device 50 in response to a match. In some embodiments, the image based operating system may also allow the camera to interact with the database and processor, which may utilize any known processor or processor-based system that typically executes one or more executable instructions or programs stored in the one or more databases (local or remote) to store, to manipulate or to retrieve data. The processor may be any conventional facility for handling processing functions, such as a microprocessor, chip, integrated circuit, application specific integrated circuit, circuit board, circuit, microcontroller, software, firmware, or combination of the above. In one embodiment, the processor is a Pentium-based processor, or dual core processor such as those used to operate personal computers.

In some embodiments the computer may send control signals to the other device (which may be part of the system or separate from the system) and activate or position the other device in a particular location. The computer may also send instructions back to the camera for it to reposition itself. In other embodiments, the other device may send signals to the computer, making possible interactive, or sensor-feedback loops, where the computer interacts based on events or conditions in the environment, or based on user interaction with one or more systems.

As shown in FIG. 2, in some embodiments, parts of the system 10 are linked through a communication network (e.g., one that operates over the internal 60 that may connect the camera 42 and the computer 30, which contains and/or controls the processor 31 and database 32. The communication network may be any suitable facility for transferring data, such as a cable, wire, wireless communication facility, Bluetooth facility, Skype, infrared technology, laser technology, fiber optic technology, radio wave based technology, electromagnetic technology, acoustic acoustics, or other communication technology of facility. Either or both of the Internet and server may be accessed through a user interface 20.

The other device 50 (see FIG. 1) may be any other device capable of being put in communication with the image based operating system (or if it is part of the system with one or more other components of the system), such as via a communication network, which may be of any type mentioned in connection with the communication network discussed above, and it may be the same or different from the above. The other device may be selected from a wide group of different possible devices, including, without limitation, one or more of a sound system, a sensor, an entertainment system, a video display system, a security system, a lock, a gate, a recording system, a measurement device, a medical device, a system for administering medicine, an appliance, an oven, a washing machine, a dryer, a stove, a dishwasher, a refrigerator, a freezer, a personal computer, a laptop computer, a PDA, a handheld computer, a server, a mainframe computer, a television, a client computer, a DVD player, a stereo system, a VCR, a compact disc player, a digital player, a DVR, a personal television recorder, a telephone, a smart phone, an alarm system, a communications system, an automated teller system, a banking system, a safe, another camera system, a speaker system, a microphone, a computer, a server, a laptop, a handheld computer, a bluetooth enabled device, an entertainment system, a television, a recorder, an appliance, a tool, an automobile system, a transportation system, a vehicle system, an emitter, a transmitter, a transceiver, an antenna, a transponder, a gaming system, a computer network, a home network, a local area network, a wide area network, the Internet, the worldwide web, a satellite system, a cable system, a telecommunications system, a modem, or a cellular phone.

In contrast to conventional operating systems that primarily respond to events that arise from keypad, mouse, clock, or similar events, the image based operating system is configured to take inputs in the form of images, either in lieu of or in addition to other events that can serve as inputs to conventional operating systems. Thus, the image based operating system is equipped with a facility for handling images that are digitized and placed into subsets and taking actions in response to the content of the images.

Figure 3:
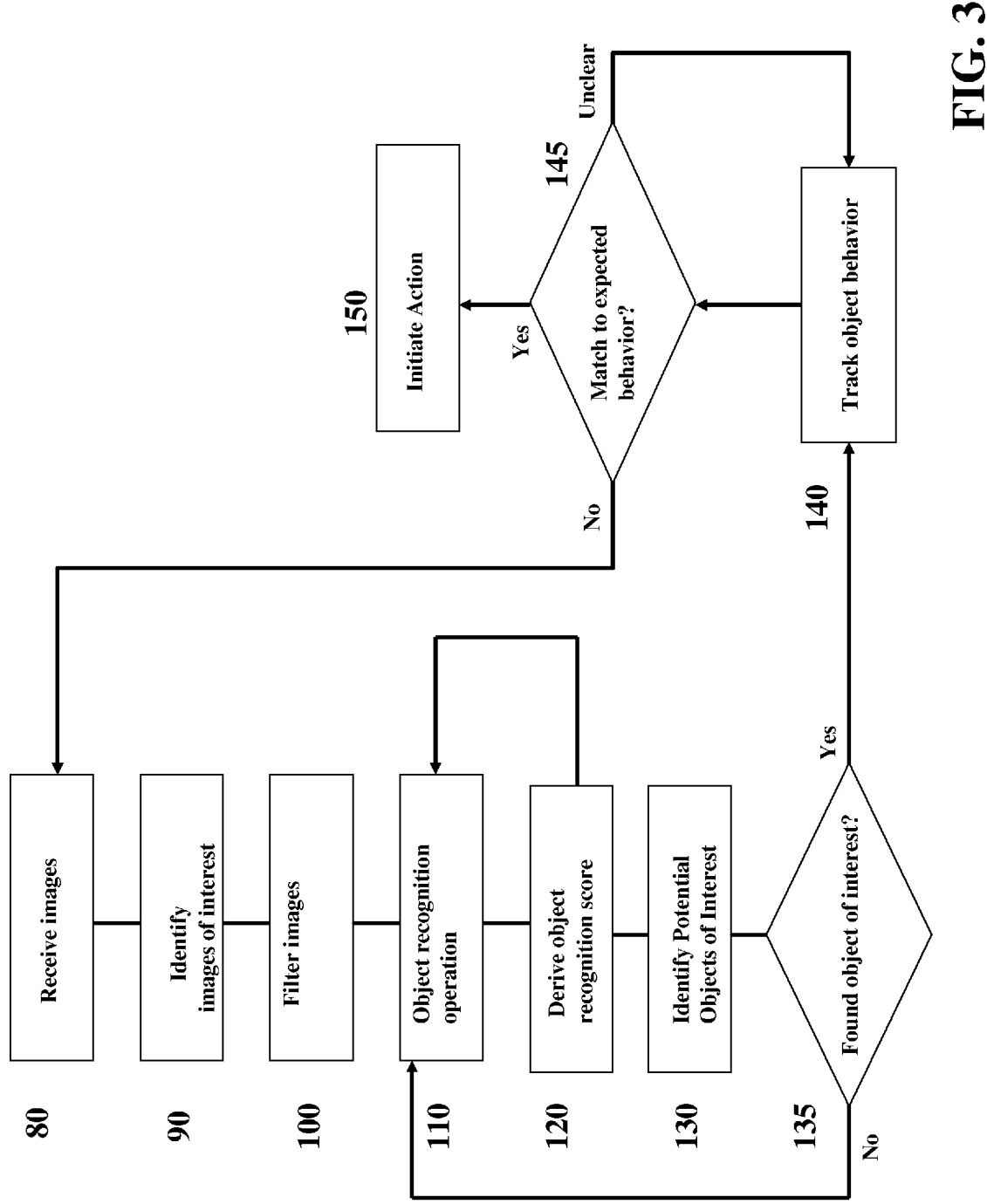
FIG. 3 illustrates a flow diagram of the process of an embodiment of an image based operating system, where an image based recognition operation is applied to the image to identify an object in video data.

FIG. 3 illustrates a flow diagram of the processes of an embodiment of the image based operating system, where an image based recognition operation is applied to the feed of images to identify it in video data. At step 80, the image based operating system receives or acquires images or image based data from the environment. These images may be stored in a database and not discarded or not discarded at least until they are filtered and scored.

Next, the data that corresponds to the images may be processed 100 to facilitate identification. This processing step may involve one or more if not all of filtering, converting to gray scale, discarding background, etc.

Figure 7:
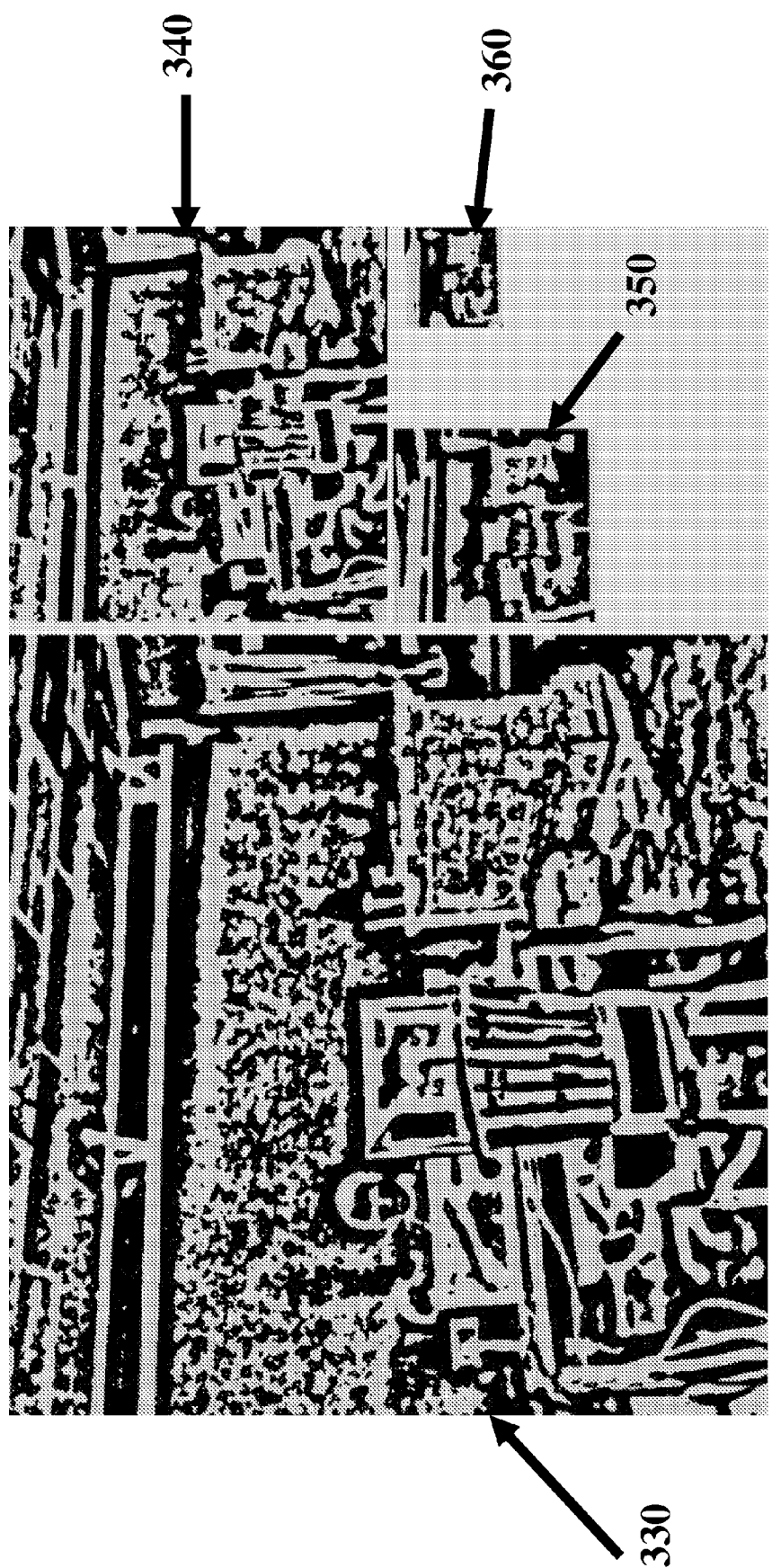
FIG. 7 depicts the results of a filtering process as applied to the image of FIG. 6.
Figure 15:
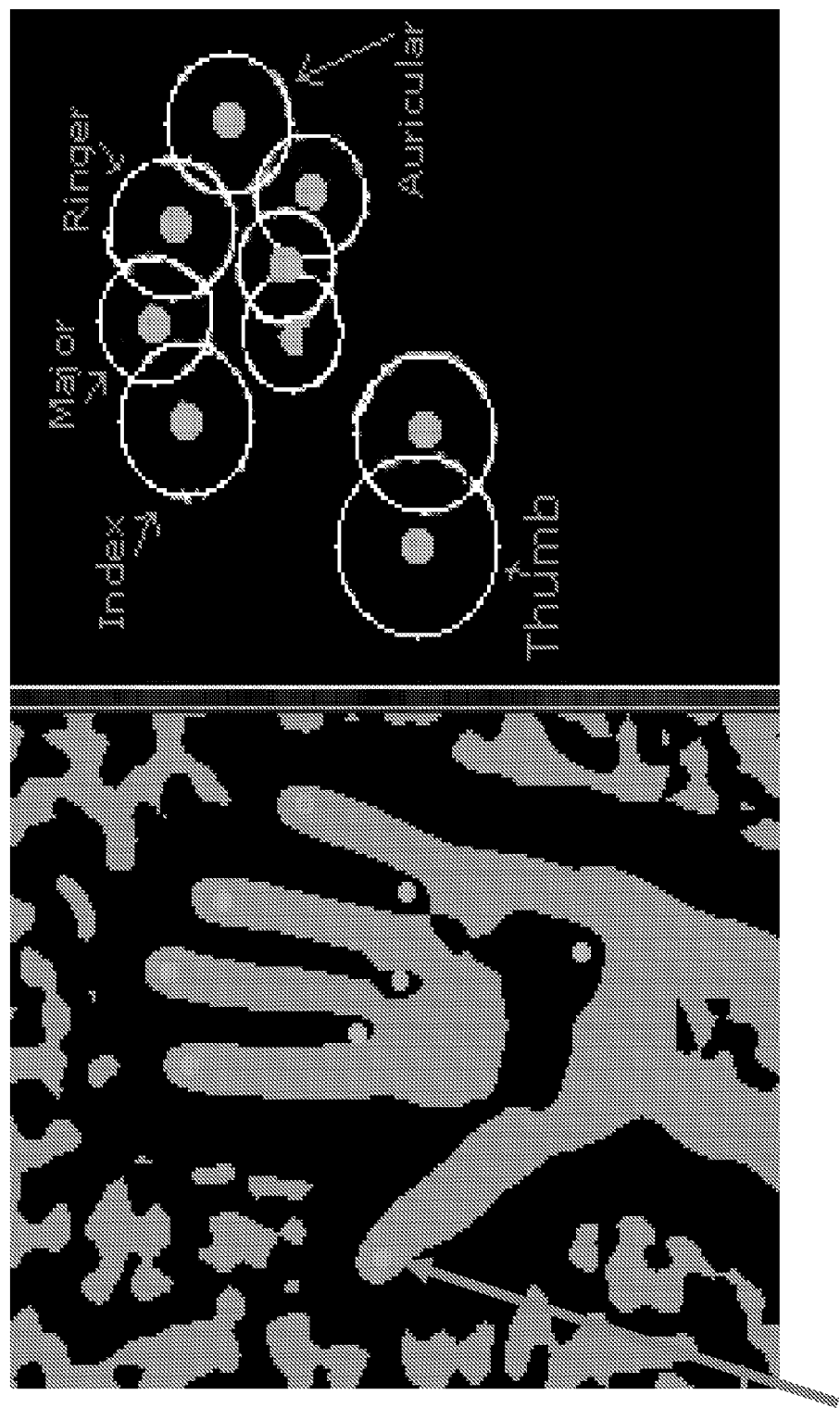
FIG. 15 depicts a detailed view of an image scoring technique that may be used in accordance with certain embodiments described herein. The figure shows the correspondence between locations of extreme difference between light and dark over a large surface as identified in the source image after a filtering process. A correspondence between those points and a template is shown at the right of the figure.

Next, the system may analyze some, all or substantially all image based data received by the system, so that the set of candidates of interest may be derived. The system may, for example, apply an object recognition operation 110, in order to determine whether within one or more frames there is an image of an object of interest. In certain embodiments, such analysis may include a step whereby an image subset is matched to a pattern. The pattern may comprise an image or template from a database, an image outline, a geometrical arrangement of points, or any representation of a particular object to which a particular image subset may be matched. In such embodiments, a score may be derived, e.g., from the closeness of a match between an image subset and a given template. Template matching may be accomplished by transforming a filtered image into a set of anchor points for features as a single pixel position that reveals the center of highest local curvature of the frontier between bi-tonal zones found during filtering. As an additional criterion, this step may be analyzed with respect to zones that exhibit a closed aspect regarding the vertically in the chosen tuning for hand detection. (The fingers should exhibit closed tips.) FIG. 7 shows a filtered image and FIG. 15 shows an extract of these centers of curvature. Many other variations exist in the surrounding raised areas that have been removed in order to improve the clarity of those figures.

If a threshold number of criteria are met and in some embodiments, met with a desired level of confidence, the system may derive an object recognition score 120 and cause it to be associated with data from the appropriate frame. Two or more frames may be analyzed independently and either sequentially or simultaneously. After the recognition score is derived, further object recognition operations may be applied 110 to the same or other images in the same or other frames. Either contemporaneously or subsequently, there can be an aggregation of scores from a plurality of frames 130 for a plurality of candidate objects. The aggregation scores can be updated as recognition scores are derived from subsequent frames.

After scores have been aggregated, the system can determine whether it has found an object of interest 135. If not, the system may perform another object recognition operation on either new frames or frames for which an initial object recognition operation was applied to provide addition information. Thus, the system may be configured so as to be able to build upon data that initially has not satisfied the threshold of a sufficient aggregate score, but is reconsidered in subsequent analyses.

If the system determines the presence of an object of interest based on the aggregate scoring, it may then track the object behavior across a plurality of frames 140. This data may be analyzed in order to inquire as to whether it matches expected behavior 145. If the results are unclear or inclusive, further tracking may be conducted across the same or additional frames. If the results indicate that the behavior does not conform with the expected behavior of the object, the system may revert back to continuing to receive new images 80 (which may either have been on-going during the analyses steps, or halted during analysis). If the observed behavior satisfies the conditions that were probed, then the system may initiate other actions 150 e.g., sending an alert to another system. Behaviors may include changes in position, size, or state (e.g., changing from an open hand to a closed fist or a series of disappearances and reappearances in the same position). Optionally, step 140 may comprise the step of receiving additional images from the environment and processing the images according to previous steps.

The system may employ one or more algorithms to determine at for example steps 135 and 145, which, if any, images may be of use for further analysis.

Although the various embodiments are not limited to any one type of processing, by way of further example, more detail is provided as to how the images may be processed during a filtering step. In a filtering step, images are made more suitable for matching purposes. The filtering step breaks down an image into a more simplified form so as to improve the performance of the system. In certain embodiments, the filtering step may comprise image preparation conversion to luminance only. This may be done by creating a scaled version at for example 25%, which may be referred to as 4×4 cell. On the 4×4 cell, the system may perform competition of a wide local average of luminance, using or averaging of 4×4 pixels on an 8×8 grid of these sequences.

Next one may compute a relative ingredient. On a scale of one image and using each 4×4 cell, the system can compute a plane of local difference of luminance using a clamping rule made of min $(\Sigma_i (a_i^2 - b_i^2), (\Sigma_i (a_i^2 + b_i^2))$, where "a" is the original image and "b" is the above average image. Variance computations may also be of value, and in order to compute the variance of the original image, one uses the transformation on each pixel, and divides the variance by the normalized gradient if the normalized gradient is not null. If the normalized gradient is null, then division is not performed and the area is flagged to be fill with the average of the resulting non flagged area.

Next, the system may cause thresholding of the resulting image. The prior steps may result in positive and negative values, which allows thresholding to zero. This will create a binary representation of what can be deemed a variation of the luminance.

In other embodiments, the filtering step may comprise any data reduction algorithm that provides a set of data that the system may use to further identify potential objects.

The aforementioned filtering steps may precede or be part of the object recognition operations. Following filtering, the system may divide the image candidates of interest into a plurality of subsets. An image subset may comprise any collection of individual image elements, such as points, lines, arcs, regions (e.g., unions of multiple points or pixels), polygons, vectors, or any other element that may be defined with relation to the underlying image. Rather than apply further analysis to the entire frame, a search may first be conducted for the presence of a minimum number of the aforementioned elements in order to identify a first set of image subsets for analysis, and then these subsets may be the first areas that the system analyzes. Other image subsets may be saved in the database for later use, and identification of objects within the first set of image subsets may be accomplished by analyzing the filtered data for a match. As discussed more fully below, in some embodiments this step first identifies objects by their potential for being part of a class, which may be defined by possession of a minimal number of common features. Based on leads found when looking for members of a class. The class may be narrowed to a subclass by applying more criteria. This narrowing may be done prior to determining whether to apply a recognition score.

In some embodiments, during a recognition operation the threshold for identification of a candidate object may be set at a first level, and if no candidate objects or an insufficient number of candidate objects are identified, it may be lowered to a second level. This lowering of the standard may be automatic and can be repeated to a third or fourth level etc. In order to be efficient, data may be retained so that when levels are changed, the data need not be re-analyzed from scratch. As a matter of practice, in other embodiments this thresholding step may be omitted, because whenever the system is likely to be used there will be data that comes out of a feature detection analysis as being the most likely to correspond to the sought after features, even if it turns out to be noise or clearly not for an object for which the system is looking. In those cases what will happen is that during analyses that look for correlations with space and time, the conclusion will be that there is low or no correlation.

Under some of the embodiments of the present invention, it is advantageous to use information related to image subsets from one frame, e.g., a first frame to improve the analysis of data for subsequent frames e.g., a second, third, fourth frame etc.

Examples of objects and object behaviors reflected in images that can be matched include images that show motion of one or more objects, images that show the proximity of motion to a particular item, images that show the proximity of two items to each other (such as for prevention of collisions), absence of motion of a particular object. When one of these items is matched, the rules can then determine the action. For example, if two items (such as two cars) are coming in too close proximity, then an alarm can be sounded to an operator. If a child is too close to a pool or a stove, or a sharp object, then an alarm can be sounded and a message sent to a parent. If an item is missing from a video, then an alert can be sent to a security guard or other person responsible for monitoring the item. In the case in which a human user of the video operating system described with respect to the present embodiment has moved an object (including one or more hands or fists) in accordance with a predefined object behavior, a signal may be sent to a computer to take appropriate action. Thus, by matching images and triggering rules, the system can provide monitoring of any environment for a wide range of purposes (e.g., lock the door, sound an alarm, turn off or on an appliance, etc.). Because the threshold for a match can be made arbitrarily difficult, and because of the flexibility inherent in the possible choice of object behaviors to observe, the probability of a false positive match can also be made arbitrarily low, so that it is appropriate to allow multiple, attempts to match. This is distinct from many conventional systems that must prevent large numbers of attempts because of the increasing probability of a false match.

Figure 4:
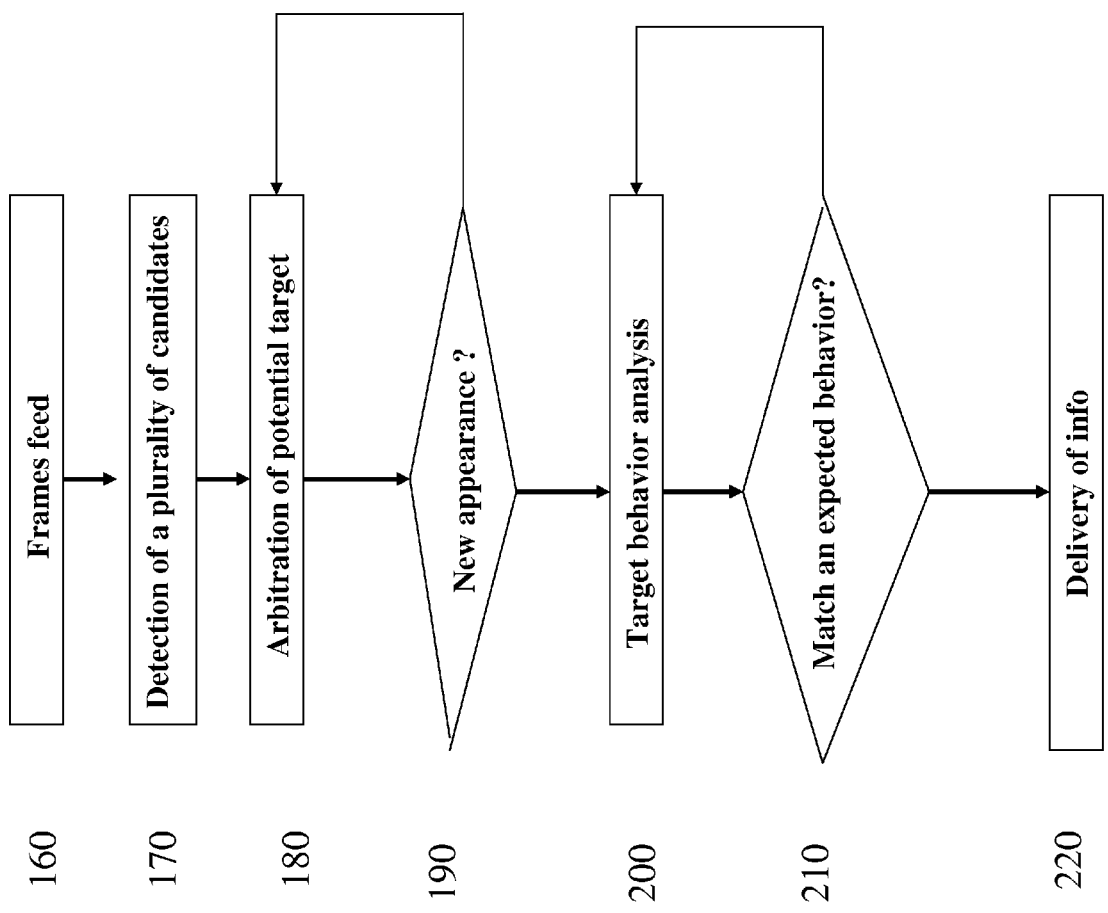
FIG. 4 illustrates a flow diagram of the process of an embodiment of the image based operating system that identifies a new appearance of an object and then applies a target behavior analysis to the newly-appeared object to recognize a relevant behavior in video data.

FIG. 4 illustrates a flow diagram of the processes of an embodiment of the image based operating system that identifies a new appearance and then applies a target behavior analysis to the new appearance to identify the object or a behavior related to the object in video data. At step 160, the image based operating system acquires images or image based data from the environment in a frames feed. These images are all stored in the database.

Next, at step 170, object candidates of interest are detected from the image data by sorting the images and assigning a score to each of them. Sorting of scores will determine if a good enough object candidate exists and thereby arbitrate the potential target, where good image candidates will be further analyzed in step 180. In certain embodiments, such analysis may include a step whereby an image subset is matched to a pattern, where a pattern may comprise an image or template from a database, an image outline, a geometrical arrangement of points, or any representation of a particular object to which a particular image subset may be matched. In such embodiments, a score may be derived, e.g., from the closeness of a match between an image subset and a given template. These images are assigned an object identifier and sorted as candidate images for further analysis and scoring. In some embodiments, the plurality of candidates may undergo preprocessing techniques to simplify the image (e.g., image filtering) to obtain filtered images that are more suitable for matching purposes. The filtering step breaks down the image into a more simplified form, (e.g., black and white, gray and/or a matrix of pixels) as points of either maximal or minimal luminance. Such points may be identified for use in further analysis. In other embodiments, the filtering step may comprise any data reduction algorithm that provides a set of data that the system may use to further identify potential objects. The image can also be divided into a plurality of image subsets or portions and then further analysis conducted.

The system may then inquire as to whether there is a new appearance of an object. If there is a high score for at least one of the image candidates and the appearance scenario involves a new object of a certain kind that stays relatively still for example $\frac{1}{5}^{th}$ of a second, then it would show a first behavior of being consistently present for a couple of frames at a given location, and the system would enter a positive detection mode and detect a new appearance 190 in the plurality of images. If not, then the candidate is still stored in the database as a pool of information to allow comparison in a future frame to be correlated with this one. This processing is involved in the pre-kinetic analysis of the object.

If a new appearance of an object is detected in the series of images, a target behavior analysis or kinetic analysis 200 is performed on the object that has a new appearance. The system will then enter a mode where the series of images are compared to a reference expected behavior image based on changes in the object's size, and/or position, the object's motion in the image, images that show proximity of motion to a particular item, or images that have unique additional characteristics identified by the same process or other processes such as fuzziness for an object, such as smoke, fire, moisture, or water, or even being explicitly described as a steady part of the video using a set up done by a user interface of images that show proximity of two items to each other. In this embodiment, the system compares the image that was captured to a database of images of predicted or expected behavior of the object to determine whether a match occurs at step 210. If at step 210 a match does not occur, processing returns to the step 200 for further target behavior analysis and/or further image capture or the system will be operated in a waiting mode where it needs another candidate that matches the appearance condition of step 190.

If a match occurs at step 210, then the system can, at step 220, transmit the information and access a plurality of rules that determine what action should be taken in response to the identification of the image. The system can then initiate an action based on the rules. When one of these items is matched, the rules can then determine the action.

Figure 5:
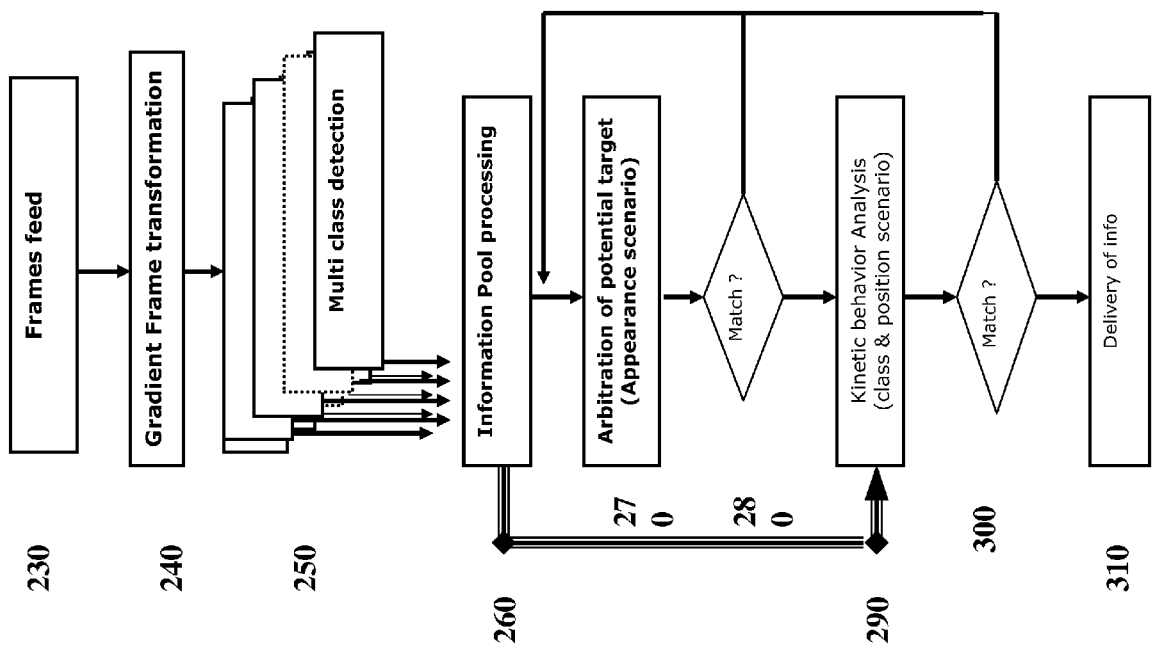
FIG. 5 illustrates a flow diagram of the process of an embodiment of the image based operating system that uses class detection to identify candidate objects in a pre-kinetic analysis and then applies kinetic behavior analysis to identify a relevant behavior of such an object in video data.

FIG. 5 illustrates a flow diagram of the processes of an embodiment of the image based operating system that uses class detection to identify candidate images in a pre-kinetic analysis and then applies kinetic behavior analysis to identify the object in video data. At step 230, the image based operating system acquires images or image based data from the environment from a frames feed. The images are preprocessed using gradient frame transformation in step 240, which uses an edge enhancement algorithm to simplify the image into a black and white or other two color image.

In these embodiments, the image is binary—each side of a relevant edge is one of the two colors. The original frame is still available as it can be used for additional discrimination of elements, such as fetching the color of a relevant part to confirm results later. The filtering is optionally applied here and is, in certain embodiments, a convolution followed by a gradient detection followed by a specific threshold. This technique is also known as gradient pre-processing, and it is well known to persons of ordinary skill in the art. Thus, there is an extract variation of luminance of the image rather than the value of the image. Each edge does not need to be topologically closed in a relevant way (e.g., a finger or even a full hand being of a single tone, the other side of the edge being of another tone). Because no accurate convoluted orientated process has been found to be safe enough to guaranty this closeness criteria of shapes, the detection does not expect a constancy on the edge code, but rather simply on presence of an edge. The process takes its benefit from a sub-part or subset of the image.

Next, at step 250 image candidates of interest are detected on a class-by-class basis. In this case, image subsets are analyzed according to their similarity to one or more members of a particular "class" of target objects. There are numerous examples of potential classes that may be used for such an analysis. For example, the class of "hand" objects may include a number of rotation and size variants of a hand object. The class of hand objects may also include, for example, both open and closed hands, or hands with certain fingers raised and others not, as well as rotational and size variants thereof. These image subsets are assigned an object identifier and sorted as candidate image subsets for further analysis and scoring. Next at step 260, the images from the multiclass detection are pooled. After each major event (typically the arrival of a new frame), the pool of information is re-evaluated and the content are then re-weighted using also new information from the new frame. A sink mechanism allows storing the amount of information of a reasonable size, based on a mix of the score of the candidates and the time spent from their first evaluation if it shows no special interest during the coming evaluation. The main objective at this stage is to evaluate if a good quality target (relative to the other) has now appeared at a place where none was present before.

Then, at step 270, image candidates of interest are identified from the image subsets data by sorting the image subsets (e.g., by applying criteria to form subclasses) and assigning a score to each of them, which in certain embodiments is based on the class analysis described above. Sorting of scores will determine if a good enough candidate exists and thereby arbitrate the potential target, where good image candidates will be further analyzed in step 270. Image subsets that have the highest scores may include new appearances of an object over a series of digital images, changes in the objects size, or position, or the lack of movement of the object, an object's motion in the image, images that show proximity of motion to a particular item, images that show proximity of two items to each other. Relevant image subsets are assigned an object identifier and sorted as candidate images for further analysis and scoring.

If a match does not occur 280, processing returns to step 260 for further information pooling and arbitration of the potential target and/or further image capture or the system can be operated in a waiting mode where it needs at least a candidate that matches the appearance condition of step 270.

If a match occurs at step 280, then the system can, at step 290 perform a kinetic analysis on the object. The system will enter a mode where the series of all images are compared to a reference expected behavior pattern model from images based on changes in the object's size and/or position, an object's motion in the image, a pattern model from images that show proximity of motion to a particular item, or pattern model from images that show proximity of two items to each other. In this embodiment, the system compares the image that was captured to a database of predicted or expected behavior of an object to determine whether a match occurs 300. If, at step 300 a match does not occur, processing returns to steps 260 and 280 for further target behavior analysis and/or further image capture or the system can be operated in a waiting mode where it needs a candidate that matches at least the appearance condition of step 270. If there is a match at step 300, there is transmission of this information and access to a plurality of rules that determine what action should be taken in response to the identification of the pattern method from images. The system can initiate an action in 310 based on the rules.

Figure 6:
FIG. 6 depicts an image of an object to be identified prior to application of the filtering process depicted in FIG. 7.

FIG. 6 depicts an image of an object to be identified 320 (a hand) in a digital image prior to application of the filtering process depicted in FIG. 7. In FIG. 7, the image is filtered and the object to be identified 330 is also filtered. The image 330 is divided into three separate images that are filtered using three different harmonics (340, 350, and 360), which build a single frame canvas that will go through the described image processing and features scoring in the same processing, which simplifies the consideration of searching for objects of different scale of a target in single shot processing. As persons of ordinary skill in the art are aware, a single frame canvas can be made by merged harmonics of geometrically reduced resolution that are done through the same filtering that gives a compatible aspect on an image to feed the detector, thereby allowing various sizes of objects to be tolerated. This can in turn assist in vector detection by simplifying vector matching.

Figure 8:
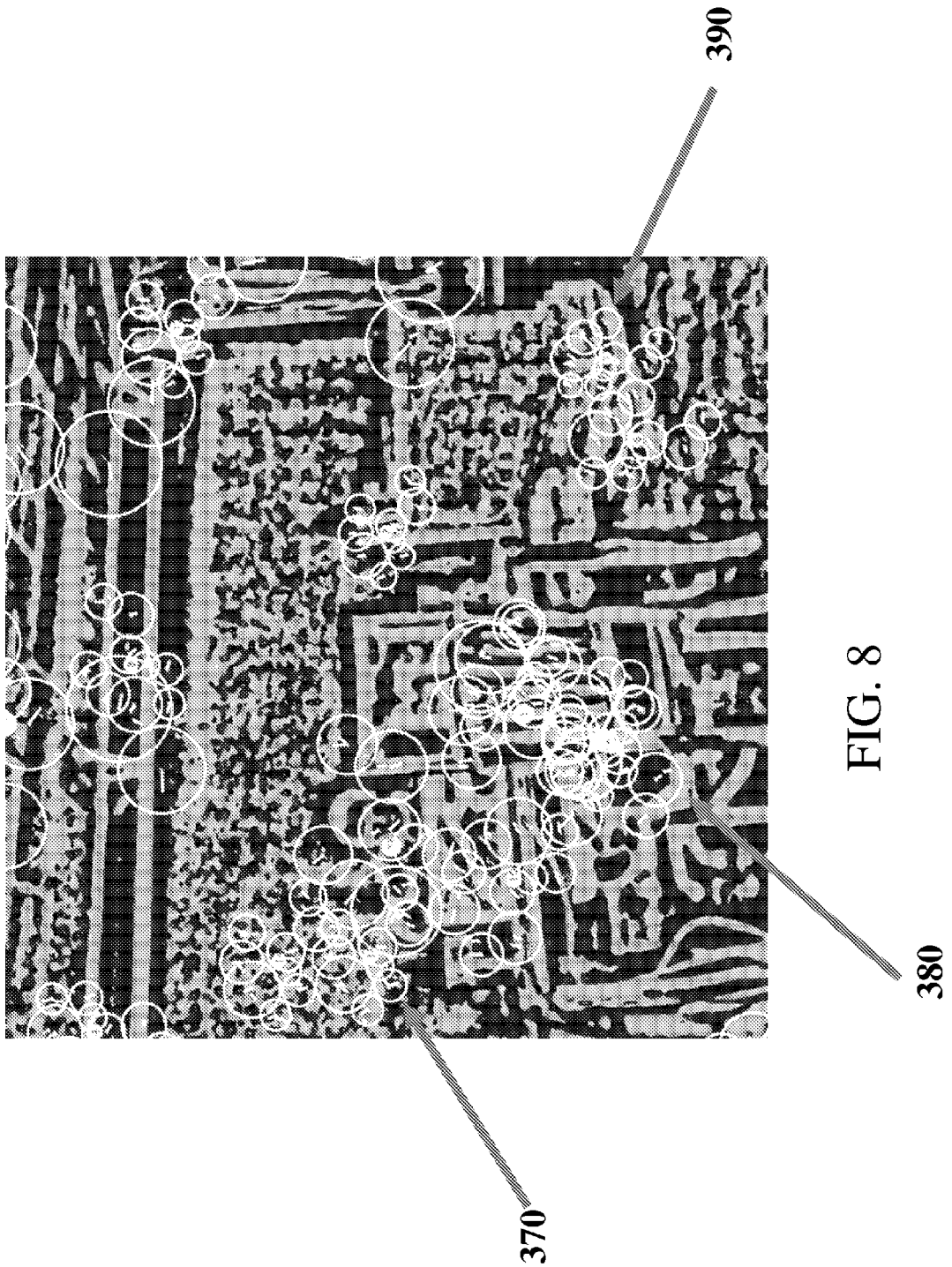
FIGS. 8 and 9 each depict an image of an object to be identified after application of the filtering process and the image is divided into a plurality of image subsets indicated by one or more points or combinations of points and/or circles or combinations of circles in the pictures. These image subsets are scored to provide object candidates.
Figure 9:
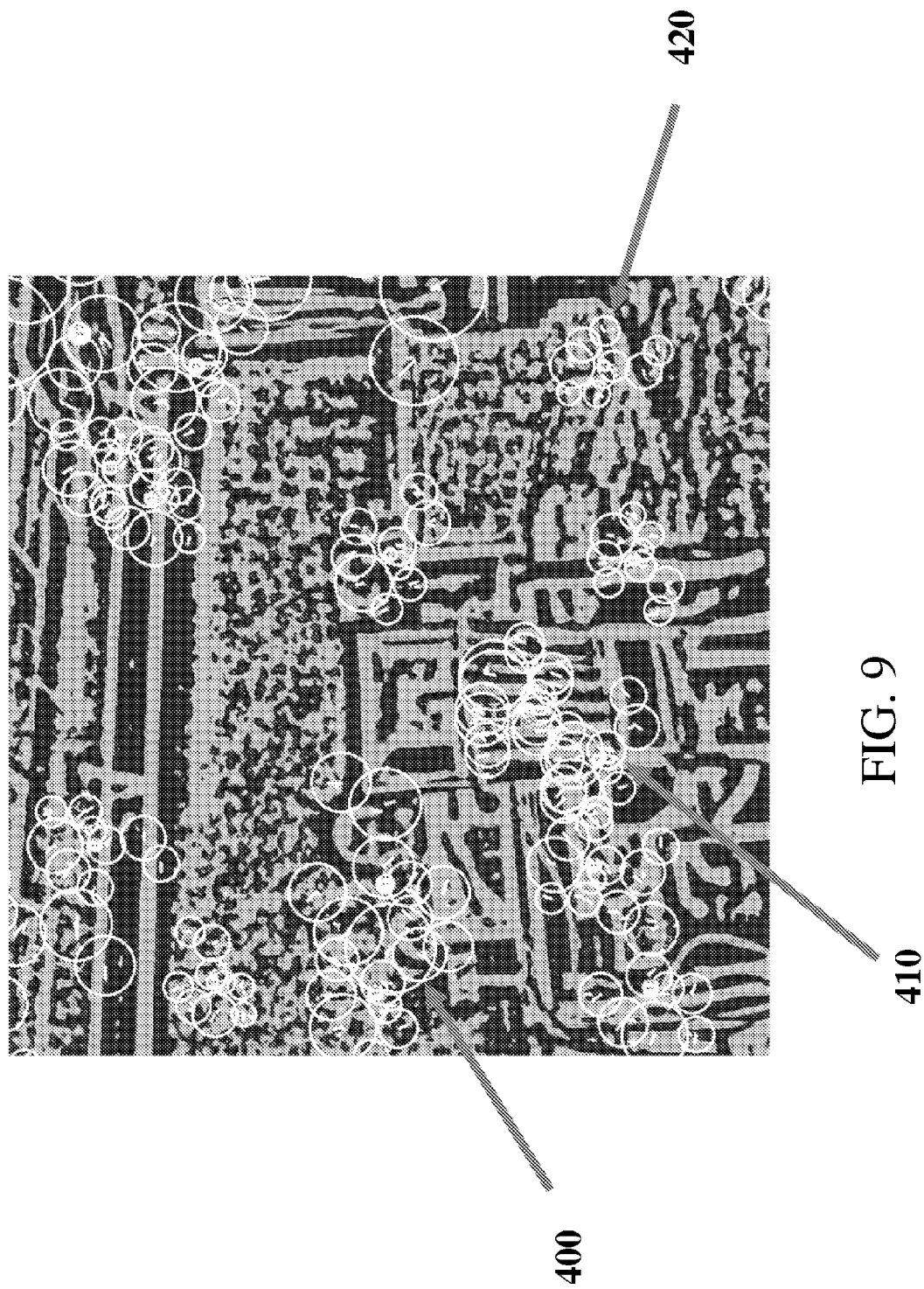

FIGS. 8 and 9 depict multiple attempts to identify an object (in this case, an open hand) in individual images after application of the filtering process. The image is divided into a plurality of image subsets indicated by various groups of circles in the pictures. The circles are centered around points that define some aspect of a human hand (the target) 370 and 400. Here the tips of the hand are then grouped by set of 9: 4 fingers, 3 inter-fingers, a thumb and 1 inter-thumb to medium. There are also other image subsets 380, 390, 410 and 420 that the system identifies as potentially being of interest. The system looks for fingers rather parallel and a thumb reasonably angled. The detector works in a loose mode and allows deformability of the model as well as geometrical transform. Various sizes shown reveal the multiplicity of size analysis. The expected hand can be of any size, and one benefit to this method is that it allows variation of size during analysis to still keep track of the same object identified as such. FIG. 9 shows detection contribution to a pool of second frame, and this sample shows the incremental contribution to the pool for the very next frame in the image.

FIGS. 10, 11, 12, and 13 depict the detection of an appearance of an open hand and its subsequent tracking through multiple frames after application of the filtering process. Each of FIGS. 10, 11, 12, and 13 is divided into a plurality of image subsets, examples of which are indicated by the groups of circles in the pictures (430, 440, 450, 460, 470, 480, 490, 500, and 510). These image subsets are scored to provide image candidates. Some of the lower scoring image subsets have been discarded from these figures so that those with the highest score are shown.

Figure 10:
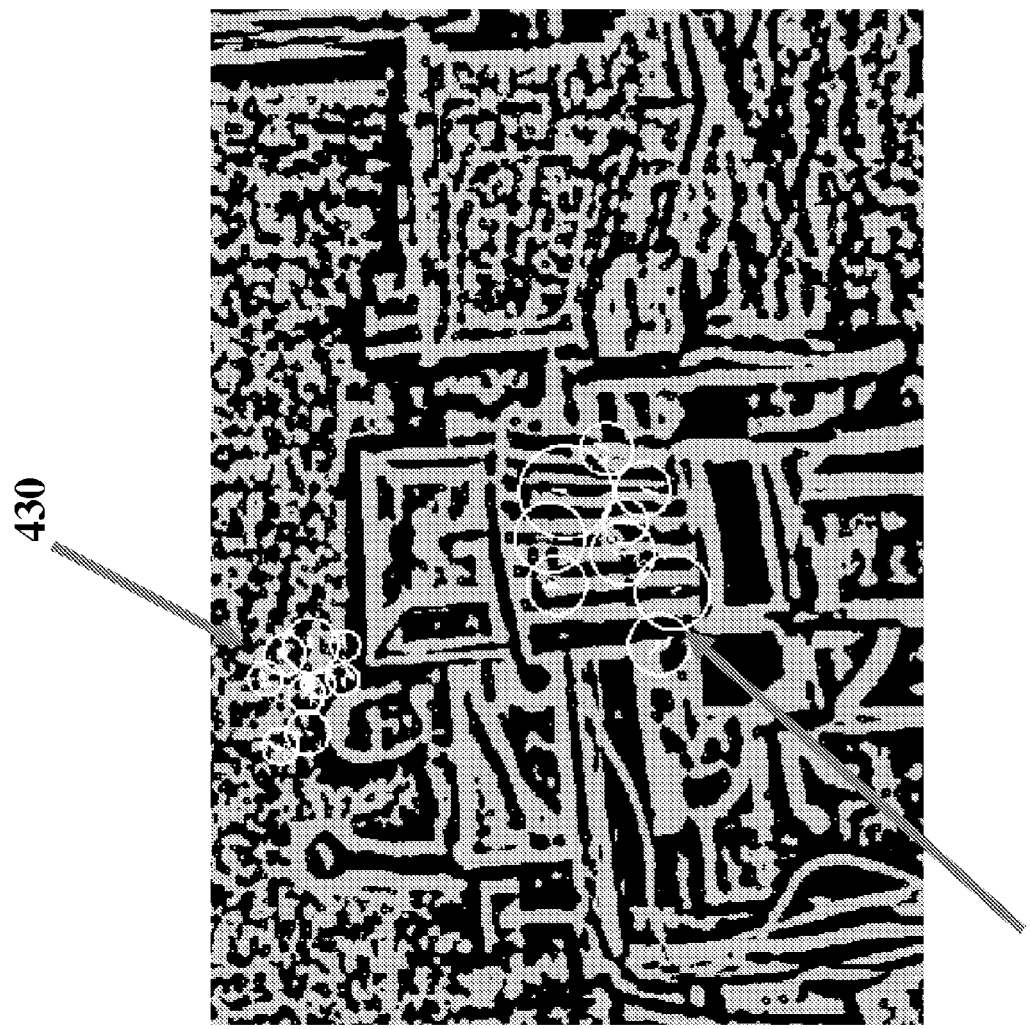
FIG. 10 depicts an image of an object to be identified (a hand) after application of the filtering process. The image is divided into a plurality of image subsets indicated by the circles in the pictures. These image subsets are scored to provide object candidates. Examples of candidates with high scores are shown.

FIG. 10 depicts the results of a detection operation as applied to a first frame which includes no open hand. The highest scoring image subsets 430 and 440 are shown. High-scoring image subset 430 is typical of a type of background noise that is characterized by varying appearances across different frames. Because such image subsets cannot be identified consistently across multiple frames, they can be discarded as part of the pre-kinetic analysis performed by the system. On the other hand, high-scoring image subset 440 depicts an image subset mistakenly identified as a candidate for an open hand, but instead corresponding to certain features of a chair. Image subset 440 appears across different frames. This constant and unvarying behavior is in contrast to the object to be detected, which in this case is an open hand that will be characterized by continuous movement and variations in size across frames. As a result, background features such as image subset 440 can also be discarded during the pre-kinetic analysis.

Figure 11:
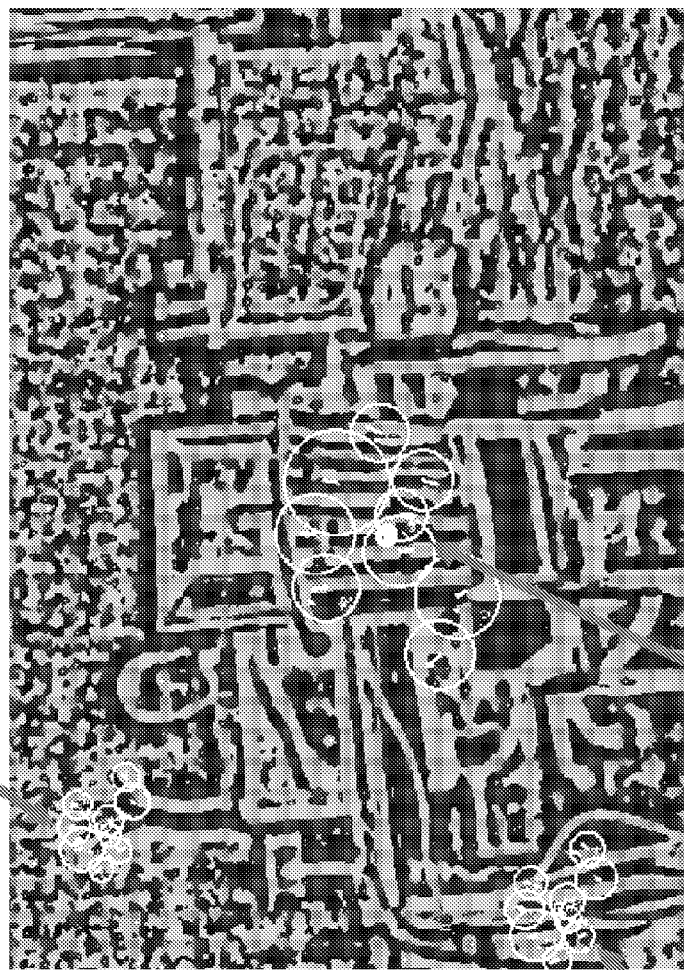
FIGS. 11, 12 and 13 each depict an image of an object to be identified (a hand) across several frames after application of the filtering process. The image is divided into a plurality of image subsets, examples of which are indicated by the clustered arrangements of points and circles in the pictures. These image subsets are scored to provide images with candidate objects. There is an appearance of a new object (an open hand) in the image.

FIG. 11 depicts a first appearance of a hand represented by image subset 460, as well as image subsets 450 and 470. Its score is high (not shown) because it matches the expected pattern. But the arbiter cannot consider it on the basis of this single frame alone. The scenario of this embodiment requires that the hand exists and stand reasonably still for at least 0.75 seconds before being considered as an eligible candidate. The pool still contains many other candidates of various quality and scores due to various class crossing.

Figure 12:
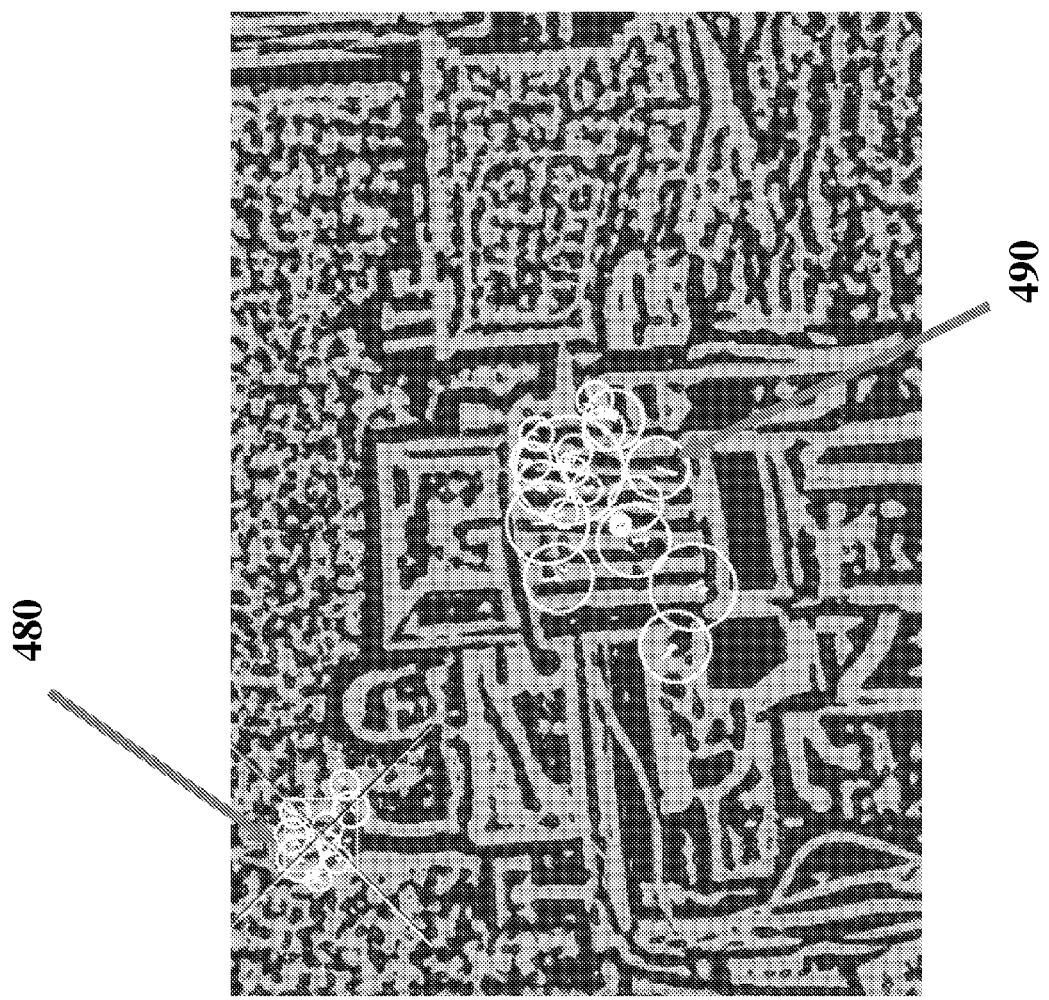

After successful and consistent identification of the hand object, which may occur across a plurality of frames, the image subset corresponding to the hand may be selected for kinetic analysis as indicated in FIG. 12. There, the image subset corresponding to the hand is identified by an "X" in conjunction with a box, as indicated in the figure.

Figure 13:

In FIG. 12, there is a positive pre-kinetic analysis, and FIG. 13 shows the last frame before closing of the hand. In the positive pre-kinetic analysis, the hand passed the test of the pre-kinetic analysis. It was a consistent candidate that grew in size as expected and had really appeared. The object is then elected for kinetic analysis, while all other members of the pool are reconsidered periodically. Kinetic analysis determines that he hand had moved; therefore, the system detected the movement. Subsequently, the system can supply its conclusions to the outside world. The consistency of the trajectory allows an eventual loosening of the detector focusing on this hand while hardening of the focusing elsewhere. This is done by a dynamic adjustment of detector parameters. It could also have an impact on filtering method parameters, like radius of averaging, as well as feature computation and the like but not limited to radius criteria for high curvature detection.

Due to the results of the algorithms applied, the chair lost its capability to be elected as a candidate, and no longer appears with a high score. The fact that the chair loses its score is nearly independent of the detection of the proper hand. The only influence across, is through the global score used for sorting. The system will keep a global score that had been increased by the existence of a detected object, but the mathematical relationship is nothing more that an averaging through a global score of all pool members.

Figure 14:
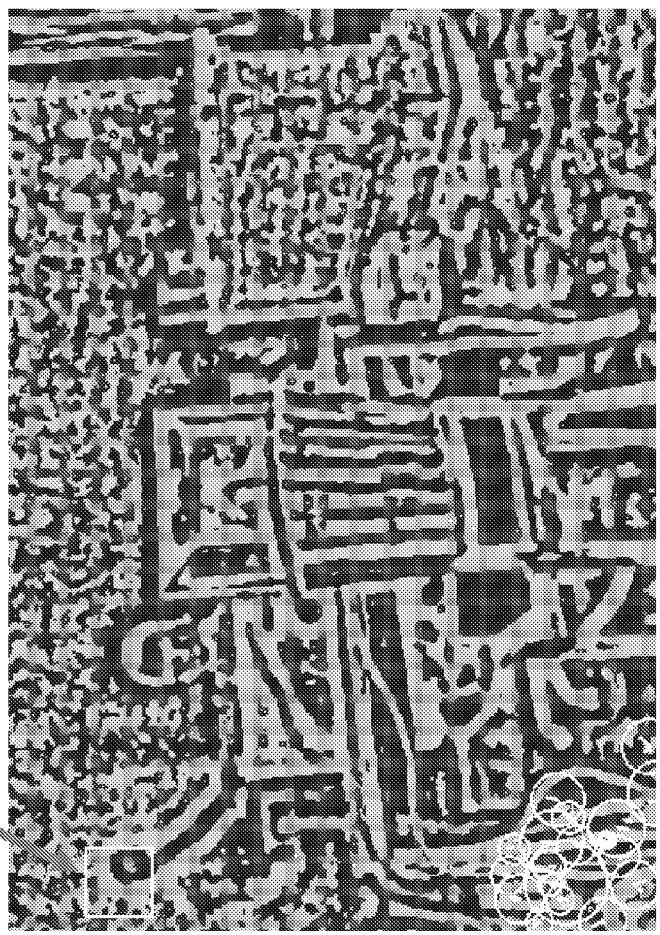
FIG. 14 depicts an image of an object to be identified (a hand) after application of the filtering process. The image is divided into a plurality of image subsets indicated by the points, circles, and combinations thereof in the pictures. These image subsets are scored to provide image candidate objects. The box indicates the object identified as being a raised and closed hand. Once a match is indicated, another action can be taken (e.g., activating another device).

FIG. 14 depicts an image of an object to be identified (a hand) after application of the filtering process, and the image is divided into a plurality of loci for analyses as indicated by the circles in the pictures. These loci are analyzed and scored to provide an image candidate. The box indicates the object identified as being a raised and closed hand. Once a match is indicated, another action can be taken (e.g., activating another device), and the system can continue to evaluate other candidates.

Detection of images from within a frame may be further understood by reference to FIG. 15. FIG. 15 depicts an enlarged view of an image to be identified after application of the filtering process and the image is divided into a plurality of image subsets indicated by the circles in the pictures. These image subsets are scored to provide image candidates. The scoring indicates an open hand. Once a match is indicated, another action can be taken (e.g., activating another device). In FIG. 15, the left side shows edge extremum for potential tips (there are a 50 more not shown). The right side shows the meta model that is fit on these extremum. It is shown here with tolerance for tips as bounding circle, each centered on each allowed extreme.

The system checks for all combinations of sizes and positions of the model on the left image, and establishes a score based on the function of distance to center. Checking can be rendered efficient by first looking for a class of objects then a subclass within it; the system keeps any fitting that shows a higher than a basic threshold score; however, the system does not immediately consider the best score as the one from the target. For example, in FIG. 7, the chair shows a rather relevant aspect that the system discards gradually because it stays fixed and therefore its score is lowered across frames. The system may also be configured to allow for missing tips; however, their contribution to the final score of this particular fit will be zero. On the good area (the obvious hand) it appears that one "in-between" for thumb and index does not have a relevant position (bottom of palm). In fact, it is missing, and the one between major finger and ring finger is obviously too low. However, among all the other combinations of the images, the process applied to this area will generate a fitting with the highest score. It will be understood that each subset (or a portion of the image) can overlap with another subset and there is no requirement that the same shape or size of sub-image be used for each separate analysis.

Based on the scores obtained by this process, different locations or sub-images in each frame may be labeled in a way appropriate for a given application. For example, certain locations may have high scores for the "open hand recognition" operation, while other locations may have high scores for the "closed hand recognition" operation. Those locations may be labeled as particular objects based on this first stage of analysis, or also identified as "candidates" for further analysis. In some cases, there may be a tie for "best candidate"—in such cases, one candidate may be randomly chosen for further analysis or all tied candidates are further analyzed. In other cases, there may be no candidate for further analysis. Where a candidate has been identified, the above analysis may be repeated for the next frame to see, for example, if the candidate has re-appeared in the same place or has moved to a nearby location. By the process of scoring candidate objects and then analyzing multiple frames, objects may be identified for any purpose deemed suitable by the application.

The description above is intended for illustrative purposed only, and the image based operating system can process a wide range of image characteristics. For example, the system may determine what an object in an image is, such as whether it is a face, a person, a body part, a symbol, a sign, or other feature. Similarly, the system may match an object in the image to another object of another image, such as matching a hand in one image to an image of a reference hand. Matching may occur between codes, gestures, faces, body parts, biometric measurements, motions, signs, symbols, or other features for a variety of purposes.

In some embodiments, the imaged-based operating system may identify a certain characteristic in a structure of an environment, such as the presence or absence of an item in an expected place, such as a valuable item in a room that is monitored by the camera, or the physical condition of an item, such as a window, roof, or door, to ensure that it has not been damaged. The system may also determine whether there is movement occurring in an environment, such as monitoring for movement in a secure environment, or monitoring for movement of a patient in a medical environment to ensure that the patient is occasionally moving. In some embodiments, the system may process images of children, pets, elderly persons, or persons with special needs and take actions based on the nature of the movements, such as proximity of a child to a dangerous item such as a stove or sharp object or unmonitored swimming pool. In some embodiments, the system may take actions based on a combination of any of the above or other image characteristics or events, or a combination of one or more of them with input from another device or system, such as input of a manual security code on a keypad, in combination with matching a hand to a reference image for security purposes.

In some embodiments, the categories of the behavior analysis may be further defined to probe whether certain behaviors are preset. For example, it may comprise branches and sub-branches to further predict behavior of a moving object. Each branch and sub-branch may change any parameter used for subsequent analysis or reassertion of the current analysis. The analysis process may have a mechanism to avoid reassertion to occur in previously rejected branches or sub-branches to allow convergence of the analysis wherein the outcome is positive or negative. In other embodiments, the environment surrounding the target is allowed to change in a consistent manner to allow analysis of a fixed target in a moving environment.

As noted above, detection can also follow a class model of detection. In a class model, this process generates an array of values for a sample set of N elements.

The aimed target can be described by a set of sampled of P elements called P-tuples that comprise a sampling of the features of the original object to recognize. P is a positive integer that corresponds to the count of samples that are part of this set. This can for example be a 2D image. Consequently, the P-tuples have a repeating organization.

A detection analysis may be modeled as a mapping from a set of P-tuples to R+ (the set of positive real numbers, including zero) that when supplied with a P-tuple sample gives a performance value that it matches with the associated subclass, 0 being the value of an absolute failure.

In order to further illustrate the process, one may further consider the employment of the concepts of classes and subclasses to objects and transformations. A "subclass" may be regarded as the qualifier of every set of P-tuples. A "class" is a set of subclasses grouped for a particular reason. The commonality can either be a geometrical transformation—for example, the class of rotations containing rotations in 10 degree increments. Thus one may have a class of cars, and a subclass of minivans or sedans, right turns or acceleration. Another example of a class may be digits on a hand, and a subclass might be thumbs, index fingers, fingers pointing up or fingers pointing down.

A typical organization may combine both concepts, where the method groups in a class the transformation that can be applied on a particular subclass to get a positive detection, as well as all of the other classes that are based on different set of subclass and corresponding P-tuples that are relevant for the purpose of the detection. For example, the class of hand detection may contain the set of open hands containing in turn all subclasses associated with P-tuples modeling open hands, as well as the set of closed hands and their own set of P-tuples, as both aspects of a hand are very different, but both may be relevant to the same final identification.

The signal to analyze may be modeled as an N-tuple, i.e., a sample set of N elements of the information to analyze. The set of N-tuples is bigger than the set of P-tuples since the detection process will search for P-tuples in the set of N-tuples Detectors may be applied in order to restrict of the input set of N-tuples. The restriction produces a set of P-tuples that are tailored for a first purpose, and that will deliver a factor qualifying the likelihood that a particular subclass exists in the P-tuples derived from the N-tuples to match. There are then theoretically as many detector mappings as there are P-tuples, but the implementer can apply different methods to analyze the P-tuples set for many detectors. This allows one to qualify more precisely, the basic purpose of a class as the transformation needed to be applied on the restriction of the N-tuples in order to provide one or more P-tuples that will be submitted to the detector for evaluation.

The process may then involve all the possible detectors submitting transformed versions of the N-tuples to an organized plurality of the detectors, gathering their results to determine the probability that the system has identified an object of a kind associated with the highest-ranking class for which the process is looking. As persons of ordinary skill in the art will recognize each class has potentially a different method of transformation, and in certain embodiments it is important for the main process to keep track of the performance of each class, because it may need to identify an object not only by its aspects but also by the way it behaves.

In certain embodiments, the detection process may involve a pool of P-tuples reduced to the bare minimum to make the implementation feasible. During the process one has a pool of candidates that are found and stored, with all the information about the class to which it belongs when the detector delivered matching performance. Next one analyzes the pool of candidates and checks if it matches certain expected scenarios associated with the normal behavior of target.

In certain embodiments the detection process can be considered as being done with three major phases. Phase 1 includes detection of candidates, where a fixed processing technique may be used on every N-tuple, which is done to obtain the result from each class and enter it in the pool of results. Phase 2 is the arbitration of potential target, which may occur synchronously or asynchronously (though processing synchronously to arrival of a new N-tuple is typical). There, the pool of candidate results from class analysis is scanned. Thus, by the end of phase 2, recognition scores may be applied and aggregated. Collectively, phases 1 and 2 may form the pre-kinetic analysis. Phase 3 is directed to target behavior analysis, which focuses on the change in behavior across frames, i.e., may form the kinetic analysis. The resulting scores may be sorted for each result by position and by class to check for an appearance scenario.

As noted above, in phase 1 there is a detection of candidates. During this phase the method does not immediately need a best candidate, but prefers to get a set of all the good candidates. This dramatically decreases the risk of missing the good target. The method will then assert later that one of these candidates has a very high likelihood of being the final candidate. The detection phase may involve a multiple detector set with limited sets of transformation. Thus, instead of using a single detector with multiple parameters, one may use multiple detectors each with strictly minimal and accurate parameters set.

Statistically speaking, if a number of detectors each work under different conditions they increase the probability that they will find candidates and that they will find a good candidate. If a system can utilize detection on a set of any kind of transformation each working with its own detector, then it should create a situation where a potentially good target will statistically appear from the outcome of a plurality of transformations.

However, it is computationally costly to do a finite set of analysis on all kinds of transformations, e.g., checking every combination of limited sized patterns. It therefore may in some embodiments be useful to reverse this concept by instead having a finite set of transformation that do a wide range of variations of such transformations, such as a discrete geometrical scaling and rotation. In certain embodiments, each of these transformations can be called a class, where each of them is able to work on any kind of analysis. In these cases, the class parameters are carefully chosen for each of the classes based on the intent of the final detection. Taking as a simple example the specific case where transformations are a scaling, and rotation, the finite set of classes may comprise scaling from 50% to 200% by increments of 10% and rotation to be from −45 to +45 by increment of 5 degrees. Then within these classes the detector is free to loosely check for the target object.

The process can also involve transformations that are far more elaborate than scaling and rotation. The purpose however is to optimize the number of classes to a bare minimum, where each class delivers a maximal number of candidates allowing a sound comparison.

In certain embodiments, the image is pre-processed through a gradient and edge detection system that will reduce the amount information to be handled. An initial pre-processing may be done to establish a zone of likelihood for the sub-part of the target, for example round shape like the tips of fingers, or round shapes like eye for a face or wheel for a car or a bike, etc. This divides the number of submissions to an acceptable level for performance reasons.

Additionally, in some embodiments, during the phase 1 describe above, the detection method may provide from 25 to 1000 candidates or 50 to 500 candidates or 100 to 250 candidates. In some embodiments, this step can be repeated at least 3 times or at least 5 times for each frame.

As note above, in phase 2, there is an arbitration of the potential target (pre-kinetics analysis). Once each class delivers a candidate, they will be submitted to a pre kinetic processing. This phase checks if among the candidates one has appeared recently. For example, the system may ask: Is this the behavior that one expects from a hand that stands still as a closed fist and then opens in front of the camera? The system will then elect the candidate for next phase, and may also be confirmed by the fact that the candidate should appear across at least one or two classes. This phase can be either done as a direct result of each class analysis or globally taking in accounts the entire supplied candidate. The apparatus here keeps track of some characteristics of the previous candidate and uses for example a proximity norm to evaluate if the candidate did appear. After a candidate has been qualified as being now present in the frame set, it is marked with all its class attributes and the process goes to phase 3 while the phases 1 and 2 continue to execute themselves in case there will be a rejection on phase 3.

The third phase is target behavior analysis, where the target is moving and every member of the pool once scanned should show a consistency for the expected movement. Movement may comprise, for example, movement in the X-Y direction, where no change in size and class is expected, or it can be a movement forward or backward (e.g., towards or away the image capturing device), where the scenario expected is a consistent crossing of classes. The information regarding the results may be continuously supplied to the system. These three phases then work in cooperation allowing the use of the time of a given detection as a criterion in addition to other possible criteria described herein.

In certain embodiments, in phase 3, the target behavior analysis, also called the kinetic analysis is conducted. In these embodiments, once a target is matched to the moving criteria, it will then be checked for a relevant behavior. These checks may include any transformations that are needed to acquire the candidate and to compare all the acquired information to a predefined pattern. In preferred embodiments, the position information is used for this analysis so that a candidate may appear in one class of detection on one frame and then on another class on a next frame and be recognized as a valid potential target if it is deleted at the same place. For example, an opening hand can go through a succession of phases that will most probably make use of a series of classes to assert the existence of a potential candidate at similar or nearby locations. If classes are based on scaling, then the coherency analysis may require that the size increase continuously rather than having an erratic presence across an eventual set of class detection.

In certain embodiments, if the target failed to comply with a particular pattern, it may then be relinked into phase 2. The candidate is not in itself rejected definitively but rather re-enters the pool of all candidates with a downgraded score. If the target is said to match the behavior analysis information, it will be supplied to the outside world (the calling application) for action. The process will continue to check for behavior until the target stops complying with the behavior condition, at which point either the system will reevaluate existing other candidates or the system will restart a search for a candidate. For instance, in this phase, if a user gestures an open fist and raises a hand, those simultaneous gestures may be discarded anyway because the system keeps track of the current target. Even if another user moves his or her hand overlaying the target once in phase three, the chance that it is wrongfully caught is very low because the score of this new target will stay lower than the one from the identified one because the identified one was boosted as a main target.

As noted above, the system does not in all embodiments necessarily work in a parallel mode or require such a mode of operation. Rather, after each new frame is received, in certain embodiments the system performs a simultaneous analysis of the pool of candidates using the three phases discussed above. Therefore, if a candidate is rejected at phase 3 it may very well happen that an embodiment of the process submits the next best set for analysis but without going through re-computation of saved frames; i.e., rather it will use stored information coming from phase 1.

All the information from class detection at phase 1 may be available at every step of each process; this allows improving accuracy by allowing comparison on previous phases. This is especially useful for establishing that a candidate is still qualified. For example, if a picture of a fixed hand exists in a room and somebody moves his or her own hand in front of it, there is a potential conflict of detection. The fixed hand will be detected and marked and potentially could lead to a rejection of the good moving detection, if one unfortunately looks close enough. But the arbiter being aware of the existence and characteristics of the fixed hand will then be authorized to use a finer granularity locally to establish target. Thus, in some embodiments in cases of multiple equal candidates for a class, the candidates are preferably chosen with an assisted random method. Detection can deliver a position of a still image, like a picture on a wall, which the system will discard as being a still object, or on the contrary, as a fit for a moving target while it is a still element that will appear in subsequent frames. Therefore, the existence of equal candidates in a class leads to a rescan of all of them on subsequent frames, but with an assisted random difference following a rotating pattern to see which one will steadily appear on the top of the sorted appearance stack.

The present invention can be implemented through a multiple set of transforms that are either predetermined or self modified during execution. These transformations may include image transformations like cropping, zooming, rotation, warping, color transform, or even mathematical space transform. In certain preferred embodiments, the number of relevant transformations may range to 10 to 1000 for a given application. Results from different transformations may be aggregated and decisions may be made on the aggregated information. There is a direct canonical isomorphism between the pixel space of the image and the vector space of the detector for any geometrical transform. Thus, a geometrical transform on the image sent to a fixed model detector may also be viewed as a vector transform on a flexible detector working on a fixed image, as it operates on individual pixels in (X,Y) space on the image.

In certain embodiments, it may be desirable to use complex transforms like color analysis or even Wavelets or FFT in the implementation of an embodiment of the current application. In such embodiments, these transforms have the possibility of diminished effect when dealing with pixels far to the key position of the transform (for example with wavelets). One may also perform a local transform on a cloud around a pixel of major interest, rather than a general transform on the whole image.

It will be apparent to those skilled in the art that various modifications and variations can be made to various embodiments described herein without departing from the spirit or scope of the teachings herein. Thus, it is intended that various embodiments cover other modifications and variations of various embodiments within the scope of the present teachings. Additionally, unless explicit or apparent from context, each feature any one embodiment is understood as being of use with any other embodiment.

What is claimed is:

1. An image based operating system, comprising:
   a camera; and
   a computer in data connection with the camera, the computer comprising or being in communication with an executable computer program code for implementing a method comprising (i) analyzing a plurality of sequential frames from a feed of frames, (ii) selecting in each frame, one or more unit areas of interest, (iii) applying to each unit area a plurality of detectors, wherein each detector provides a value expressing one aspect of a target object, (iv) assembling data in a sample vector, wherein the data comprises a plurality of components and each component is the individual value outcome of a given detector applied on a given unit area from a given frame, and (v) evaluating the performance of the sample vector by counting in the vicinity of the sample vector, all vectors known with the target object to form a first count, and counting all vectors known with or without the target object, as acquired during a training phase to form a second count, wherein the ratio of the first count to the second count estimates the probability of the presence of the target object, and the computer comprising a module for outputting the results of said method, wherein if a threshold probability of presence is met said results indicate that an object has been identified,
   wherein after the object has been identified, said computer causes another system to activate, the other system comprising at least one of a security system, an alarm system, a communications system, an automated teller system, a banking system, a safe, another camera system, a speaker system, a microphone, another computer, a server, a laptop, a handheld computer, a bluetooth enabled device, an entertainment system, a television, a recorder, an appliance, a tool, an automobile system, a transportation system, a vehicle system, a sensor, an emitter, a transmitter, a transceiver, an antenna, a transponder, a gaming system, a computer network, a home network, a local area network, a wide area network, the Internet, the worldwide web, a satellite system, a cable system, a telecommunications system, a modem, a telephone, a cellular phone, or a smart phone, and
   wherein the computer is capable of identifying a characteristic in a candidate image and taking an action based on the characteristic, the characteristic being a gesture and comprising at least one of movement of an item in an environment, movement of an item into an environment, movement of an item out of an environment, appearance of an item in an image, movement of a hand, finger, limb, head, neck, face, shoulder or a gait of a person, action of a pet, action of a child, action of a person with special needs, or action of an elderly person.

2. The image based operating system according to claim 1, wherein the camera is located in an environment and the environment is at least one of an airport, an airplane, a transportation venue, a bus, a bus station, a train, a train station, a rental car venue, a car, a truck, a van, a workplace, a ticketed venue, a sports arena, a concert arena, a stadium, a sports venue, a concert venue, a museum, a store, a home, a pool, a gym, a health club, a golf club, a tennis club, a parking lot, an ATM, a storage location, a safe deposit box, a bank, or an office.

3. The image based operating system according to claim 2, wherein the environment is the home and wherein the system is used to control access to all or parts of the home based on matching a hand gesture.

4. The image based operating system according to claim 3, wherein the other system triggers an alarm and the object that has been identified is at least one of an intruder, smoke, fire, water, proximity of a child to a dangerous condition, or proximity of an elderly person to a dangerous condition.

5. The image based operating system according to claim 1, wherein the object that has been identified is at least one gesture comprising a thumbs up sign, a thumbs down sign, an okay sign, at least one finger, a hand motion, a head motion, a sign language motion, a lip motion, or an eye motion.

6. The image based operating system according to claim 1, wherein the object that has been identified is in close proximity to another object and is about to collide with the another object.

* * * * *